US007333482B2

(12) United States Patent
Johansson et al.

(10) Patent No.: US 7,333,482 B2
(45) Date of Patent: Feb. 19, 2008

(54) ROUTE OPTIMIZATION TECHNIQUE FOR MOBILE IP

(75) Inventors: Fredrik Johansson, Bandhagen (SE); Jan Forslöw, Stockholm (SE)

(73) Assignee: Interactive People Unplugged AB, Stockholm (SE)

( * ) Notice: Subject to any disclaimer, the term of this patent is extended or adjusted under 35 U.S.C. 154(b) by 568 days.

(21) Appl. No.: 09/742,443

(22) Filed: Dec. 22, 2000

(65) Prior Publication Data

US 2002/0080752 A1    Jun. 27, 2002

(51) Int. Cl.
    *H04L 12/66* (2006.01)
(52) U.S. Cl. ............... 370/353; 370/395.5; 370/465; 455/438; 455/445
(58) Field of Classification Search ........ 370/352–354, 370/389, 395.5, 465, 466, 467, 235, 381; 709/212–215; 710/52–54; 455/432.1, 433, 455/436–440, 442, 445
    See application file for complete search history.

(56) References Cited

U.S. PATENT DOCUMENTS

| | | | | |
|---|---|---|---|---|
| 6,160,804 | A * | 12/2000 | Ahmed et al. | 370/349 |
| 6,374,112 | B1 * | 4/2002 | Widegren et al. | 455/452.2 |
| 6,430,698 | B1 * | 8/2002 | Khalil et al. | 714/4 |
| 6,434,134 | B1 * | 8/2002 | La Porta et al. | 370/338 |
| 6,445,922 | B1 * | 9/2002 | Hiller et al. | 455/433 |
| 6,452,920 | B1 * | 9/2002 | Comstock | 370/349 |
| 6,473,399 | B1 * | 10/2002 | Johansson et al. | 370/229 |
| 6,496,505 | B2 * | 12/2002 | La Porta et al. | 370/392 |

OTHER PUBLICATIONS

Perkins, Charles and Johnson, David B., "Route Optimization in Mobile IP draft-ietf-mobileip-optim-09.txt", 26 pages, http://www.ieft.org/proceedings/00iul/I-D/mobileip-optim-09.txt, printed Sep. 23, 2005.
Alexander, S. and Droms, R., "DHCP Options and BOOTP Vendor Extensions," 32 pages, http://www.ietf.org/rfc/rfc2132, printed Sep. 22, 2005.
Calhoun, Pat R., Rubens, Allan C., Akhtar, Haseeb, and Guttman, Erik, "Diameter Base Protocol," 45 pages, http://www.ietf.org/proceedings/00dec/1-D/draft-calhoun-diameter-17.txt, printed Sep. 22, 2005.
Calhoun, Pat R. and Perkins, Charles E., "Diameter Mobile IP Extensions," http:quimby.gnus.org/internet-drafts/draft-calhoun-diameter-mobileip-11.txt, 28 pages, printed Sep. 22, 2005.

(Continued)

*Primary Examiner*—Chi Pham
*Assistant Examiner*—Donald L Mills
(74) *Attorney, Agent, or Firm*—Banner & Witcoff, Ltd.

(57) ABSTRACT

The present invention relates to mobile data communications in general, and more specifically, the present invention describes a route optimization technique requiring no awareness of the Mobile IP protocol by a Correspondent Node when forwarding traffic using the shortest path between a Mobile Node and the Correspondent Node in a visiting domain. The invention describes the management of route entries, network address translations and firewall filters in order to provide a secure, yet flexible deployment of Mobile IP route optimization. Specific considerations are described for the case of separate Foreign Agent and co-located care-of address respectively.

6 Claims, 26 Drawing Sheets

OTHER PUBLICATIONS

Calhoun, P. and Perkins, C., "Mobile IP Network Access Identifier Extension for IPv4," 9 pages, http://www.ieft.org/rfc/rfc2794.txt, printed Sep. 22, 2005.

Dierks, T. and Allen, C., "The TLS Protocol," 75 pages, http://www.merit.edu/internet/documents/rfc/rfc2246.txt, printed Sep. 22, 2005.

Droms, R., "Dynamic Host Configuration Protocol," Mar. 1997, 43 pages, http://www.merit.edu/internet/documents/rfc/rfc2131.txt, printed Sep. 22, 2005.

Knight, S., Weaver, D., Whipple, D., Hinden, R., Mitzel, D., Hunt, P., Higginson, P., Shand, M., and Lindem, A., "Virtual Router Redundancy Protocol," Apr. 1998, 26 pages, http://www.merit.edu/internet/ documents/rfc/rfc2338.txt, printed Sep. 22, 2005.

Montenegro, G., "Reverse Tunneling for Mobile IP," May 1998, 18 pages, http://www.merit.edu/internet/documents/rfc/rfc2344.txt, printed Sep. 22, 2005.

Perkins, C., "IP Mobility Support," Oct. 1996, 74 pages, http://www.merit.edu/internet/documents/rfc/rfc2002.txt, printed Sep. 22, 2005.

\* cited by examiner

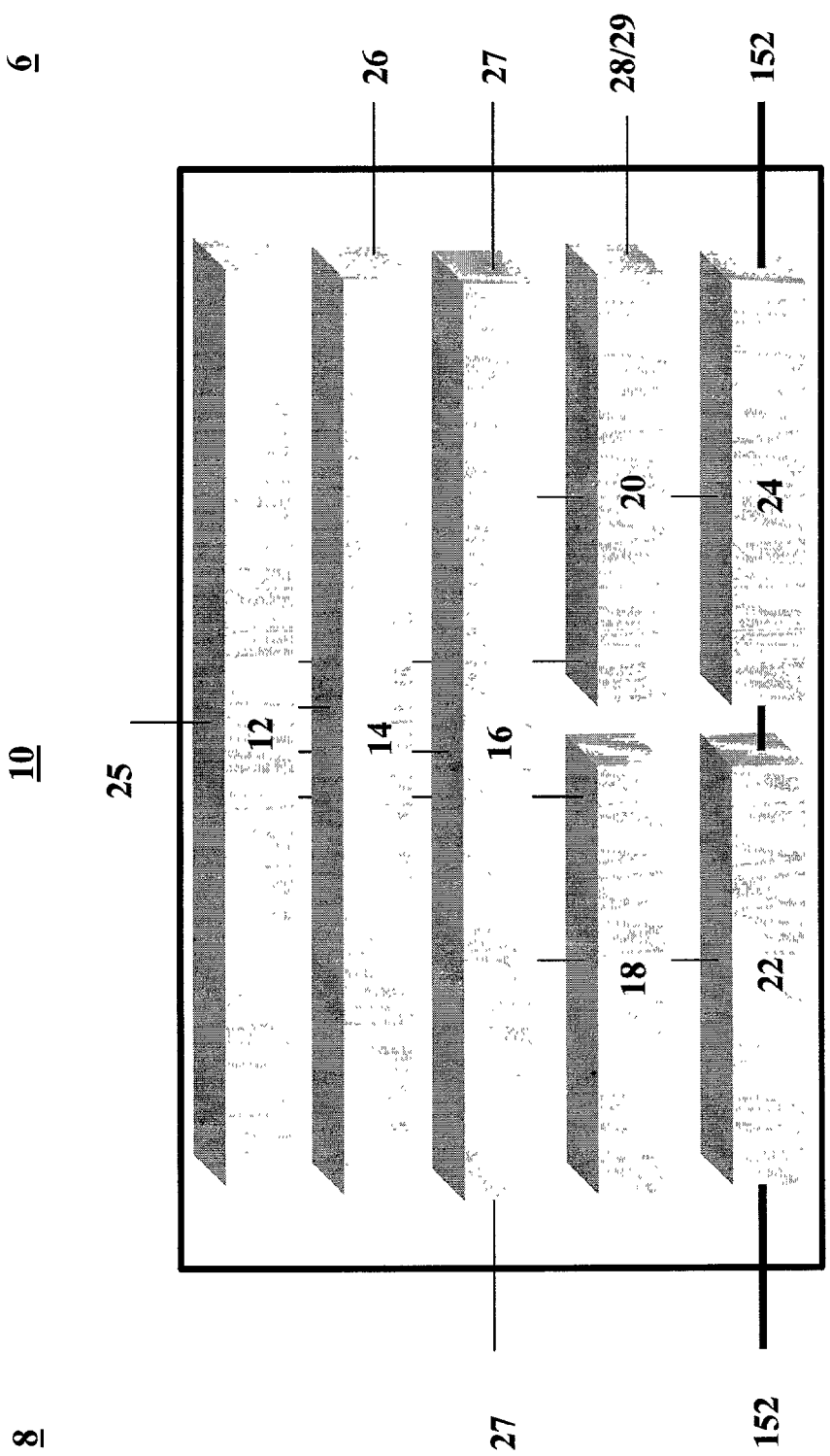

Fig. 4

| 40 | 41 | 50 | 51 | 52 |
|---|---|---|---|---|
| 3 10.0.0.1 | 4a 10.0.4.3 | 50a | - | 58 |
| 3 10.0.0.1 | 4b 10.0.0.2 | 50b | Dynamic 3, 53 | 58 – 59 |
| 3 10.0.0.1 | 4c 10.0.0.1 | 50a | Dynamic 3, 53 | 58 – 57 |
| 3 10.0.0.1 | 4d 204.34.9.1 | 50d | - | 56 |
| 4a 10.0.4.3 | 3 10.0.0.1 | 50a | - | 58 |
| 4b 10.0.0.2 | 3 10.0.0.1 | 50b | Stateful NAT 54 | 58 – 59 |
| 4c 10.0.0.1 | NAT (3 10.0.0.1) | 50a | Stateful NAT 54 | 58 – 57 |
| 4d 204.34.9.1 | 3 10.0.0.1 | 50d | - | 56 |

Fig. 5

| 40 | 41 | 42 | 43 |
|---|---|---|---|
| 3 10.0.0.1 | 4a 10.0.4.3 | 32a | 44a (<44b) |
| 3 10.0.0.1 | 4e 10.0.4.3 | 32c | 44b |
| 3 10.0.0.1 | 4b 10.0.0.2 | 32b | - |
| 3 NAT (10.0.0.1) | 4c 10.0.0.1 | 32c | 48a (<48b) |
| 3 10.0.0.1 | 3 10.0.0.1 | 32b | 48b |
| 3 10.0.0.1 | 4d 204.34.9.1 | 32a | 45a (<45b) |
| 3 10.0.0.1 | 4d 204.34.9.1 | 32c | 45b |
| 4a 10.0.4.3 | 3 10.0.0.1 | 32b | - |
| 4b 10.0.0.2 | 3 10.0.0.1 | 32b | 46a (<46b) |
| 4b 10.0.0.2 | 3 10.0.0.1 | 32c | 46b |
| 4c 10.0.0.1 | 3 (NAT) 10.0.0.1 | 32b | 47a (<47b) |
| 4c 10.0.0.1 | 3 (NAT) 10.0.0.1 | 32c | 47b |
| 4d 1204.34.9.1 | 3 10.0.0.1 | 32b | - |

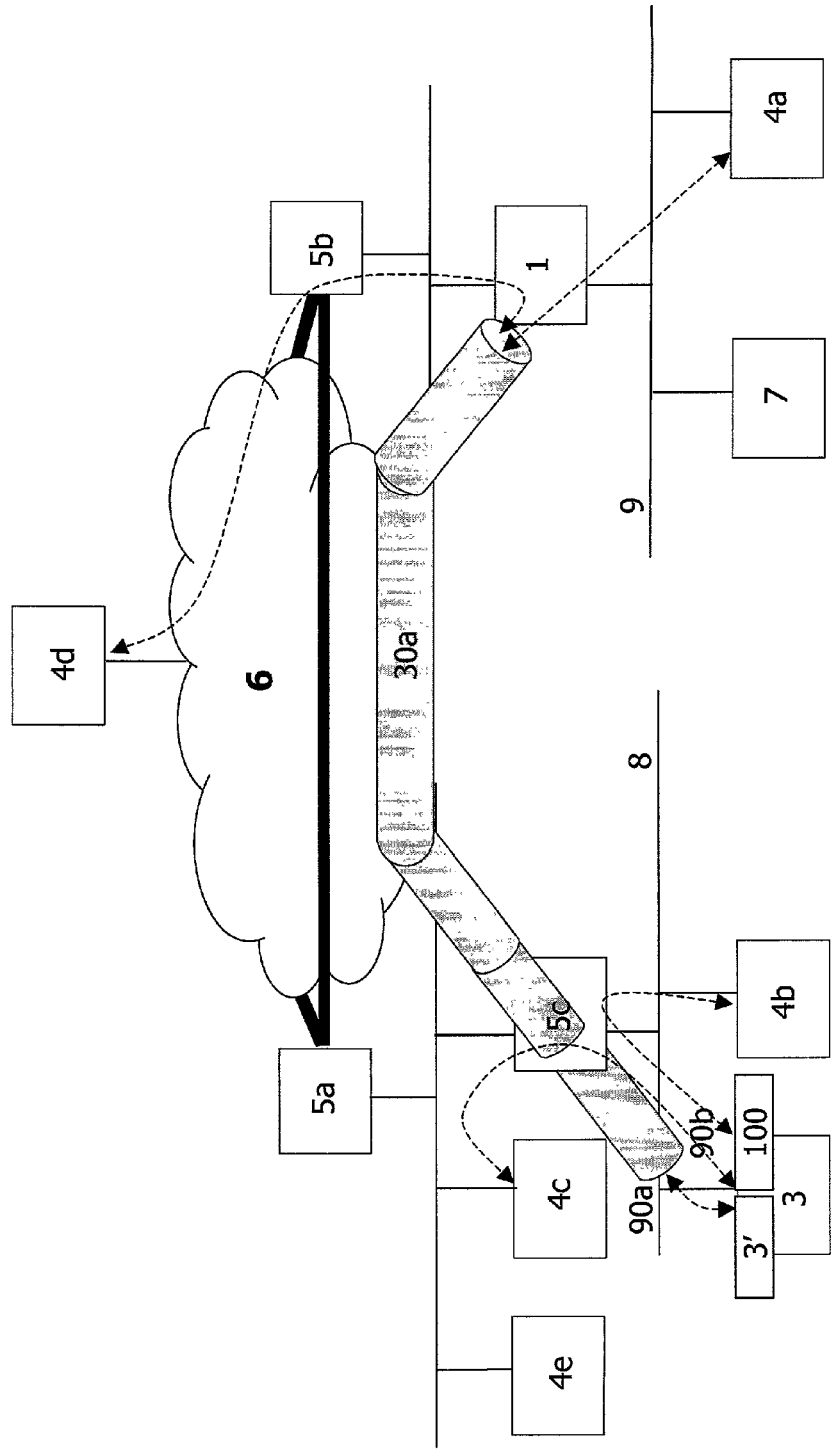

Fig. 10

| 40 | 41 | 50 | 52 |
|---|---|---|---|
| 3 10.0.0.1 | 4a 10.0.4.3 | 50a | 58 |
| 100 10.0.0.2 | 4b 10.0.0.3 | 50b | 58 |
| 100 10.0.0.2 | 4c 10.0.0.1 | 50a | 58 – 59 |
| 3 10.0.0.1 | 4d 204.34.9.1 | 50d | 56 |
| 4a 10.0.4.3 | 3 10.0.0.1 | 50a | 58 |
| 4b 10.0.0.3 | 100 10.0.0.2 | 50b | 58 |
| 4c 10.0.0.1 | 100 10.0.0.2 | 50a | 58 – 59 |
| 4d 204.34.9.1 | 3 10.0.0.1 | 50d | 56 |

Fig. 11

| 40 | 41 | 42 | 43 |
|---|---|---|---|
| 3 10.0.0.1 | 4a 10.0.4.3 | 90a | 110a (<110b) |
| 100 10.0.0.2 | 4e 10.0.4.3 | 90b | 110b |
| 100 10.0.0.2 | 4b 10.0.0.3 | 90b | 111a |
| 3 10.0.0.1 | 3 10.0.0.1 | 90c | 112a |
| 100 10.0.0.2 | 4c 10.0.0.1 | 90b | 112b (<112a) |
| 3 10.0.0.1 | 4d 204.34.9.1 | 90a | 113a (<113b) |
| 100 10.0.0.2 | 4d 204.34.9.1 | 90b | 113b |

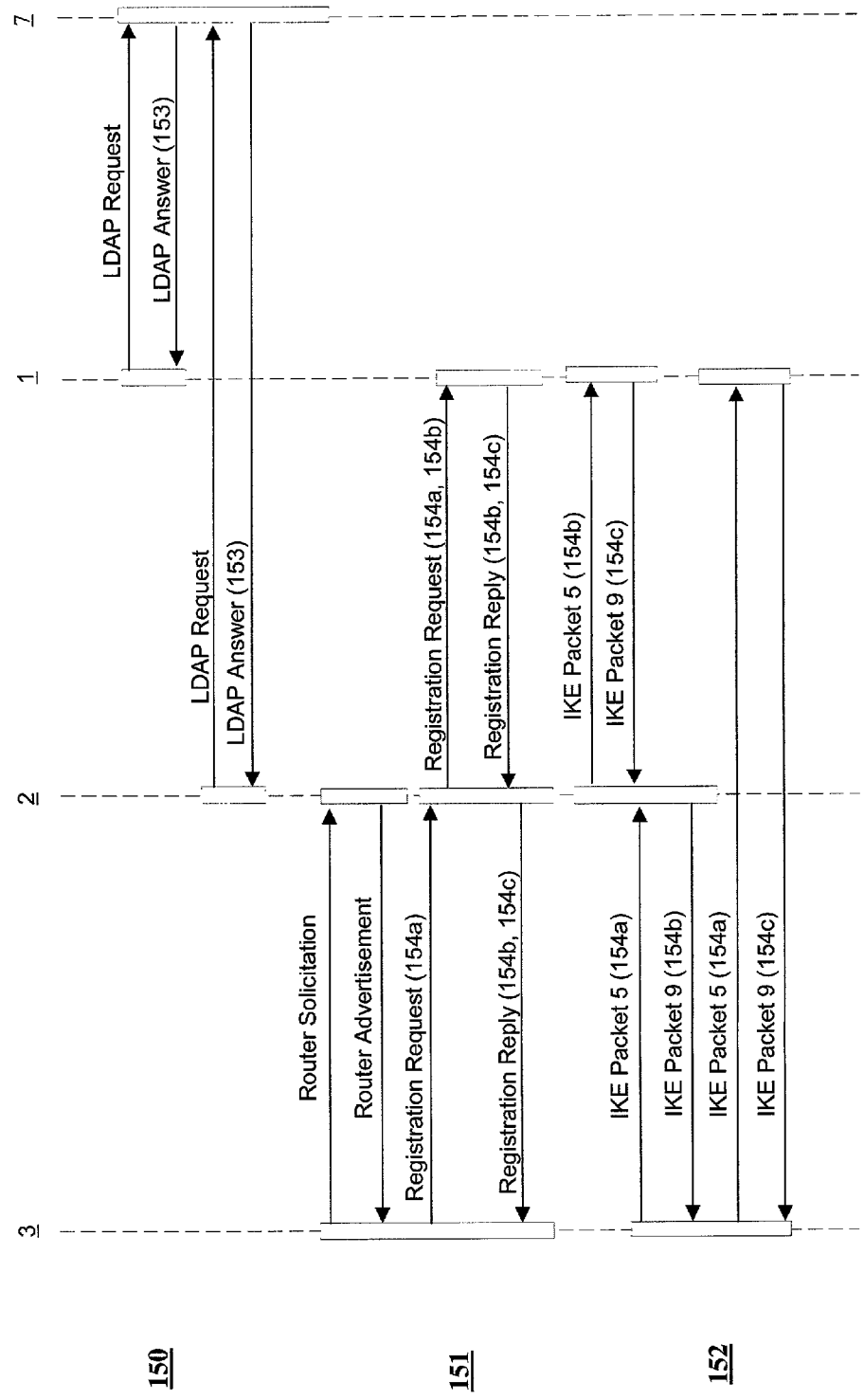

Fig. 15c ertificate:
   ata:
      ersion: 3 (0x2)
      erial Number: 3 (0x3)
      ignature Algorithm: d5WithRSAEncryption
      ssuer 159: C=SE, ST=Sweden, =Stockholm, O=ipUnplugged, U=Certificate Authority, N=msm.ipunplugged.com/ mail=msm@ipunplugged.com
      alidity
         ot Before: Jan 9 22:29:08 2000 GMT Not fter : Jan 8 22:29:08 2001 GMT
      ubject 160: C=SE, ST=Stockholm, =Stockholm, O=ipUnplugged, U=Development, N=forslow.ipunplugged.com/ mail=forslow@ipunplugged.com Subject Public Key Info:
  Public Key Algorithm: rsaEncryption
  RSA Public Key: (1024 bit)
  Modulus (1024 bit):
    00:b6:7f:3d:a9:84:6c:ff:6f:da:e4:38:23:d6:36:
    37:13:2a:5a:30:96:c6:eb:4a:c9:b7:34:4e:e5:2a:
    43:2f:fb:20:08:f8:e3:43:54:ce:cf:45:02:df:68:
    2b:31:d8:0c:21:50:c0:b6:14:0b:95:a8:eb:8e:e0:
    67:26:40:8a:83:68:7d:9a:04:05:2b:7e:7e:0c:cf:
    c7:14:b8:b6:17:63:35:2e:82:5c:86:35:4e:e6:b9:
    5e:4d:54:e2:26:2f:2b:ef:ea:98:ea:8b:f9:3f:af:
    f6:b2:41:3d:62:11:57:f7:4a:08:d5:30:9a:3a:33:
    d9:aa:a7:6f:3d:75:90:05:cb
  Exponent: 65537 (0x10001)

X509v3 extensions:
  X509v3 Subject Alternative Name 158:
  Address 157=10.0.0.1
  UFQDN 156=jan.forslow@ipunplugged.com
Signature Algorithm: md5WithRSAEncryption
  6f:3f:1a:70:d0:b4:6f:39:46:30:74:7c:08:1a:fd:bb:3b:74:
  43:c3:59:04:d2:83:b6:7e:1b:50:9c:77:4a:50:6f:35:48:f4:
  a6:63:88:03:13:60:b3:17:41:f7:ea:7e:79:7d:d0:3b:d0:c8:
  4b:b9:c3:51:82:9f:e6:ab:a0:b3:93:c1:88:ba:4c:58:ab:33:
  54:d3:30:83:1d:9e:aa:74:d2:8c:5f:87:89:a7:76:2c:27:23:
  d4:8b:2a:12:c2:86:49:a8:86:8b:57:b8:c7:f7:6a:4d:f8:0c:
  87:cd:4e:52:78:b6:19:51:90:e0:52:c4:8d:c8:c1:30:75:be:
  73:25

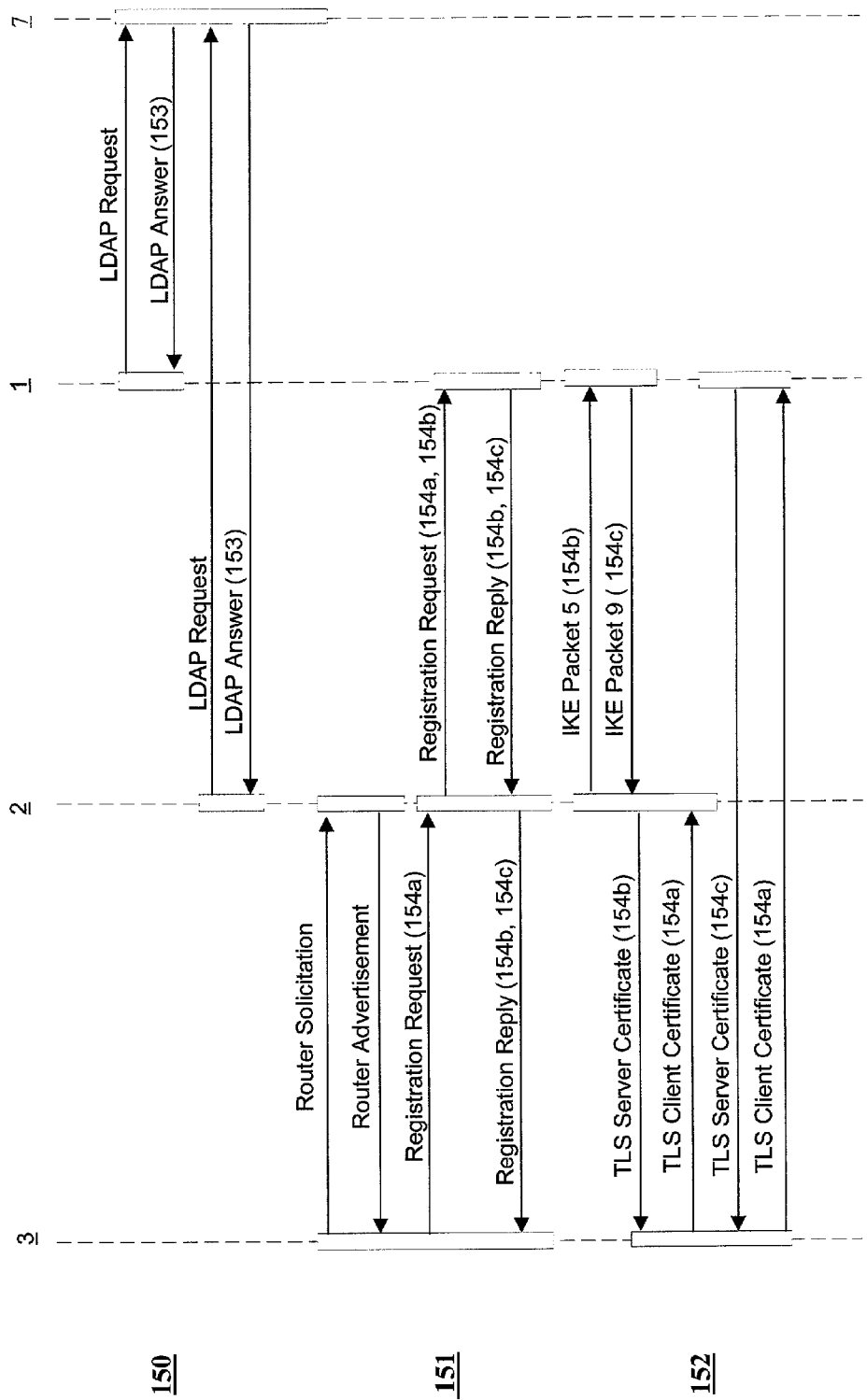

ROUTE OPTIMIZATION TECHNIQUE FOR MOBILE IP

FIELD OF THE INVENTION

The present invention relates to mobile data communications in general. More specifically, the present invention describes a route optimization technique requiring no awareness of the mobile IP protocol by a Correspondent Node. Still the invention makes it possible to forward traffic using the shortest path between a Mobile Node and the Correspondent Node in a visiting domain.

BACKGROUND AND SUMMARY OF THE INVENTION

The following definitions are introduced for the purpose of clarity.

AAA: Authentication, Authorization and Accounting. AAA is a common name for both RADIUS and DIAMETER, i.e. solutions providing customer care, control and billing in a large IP network.

DIAMETER: A successor of RADIUS with increased security and scalability features compared to its predecessor RADIUS. It is currently under standardization by the IETF.

DHCP: Dynamic Host Configuration Protocol. DHCP is an Internet Engineering Task Force (IETF) standard for allocating Internet Protocol addresses and other configuration information to User Systems. User Systems can either be Fixed Hosts or Mobile Hosts. The allocation is done each time when the User System is started. A DHCP server allocates the information, which is then transferred to a DHCP client. An Internet Service Provider or an IT-department controls the DHCP server. The DHCP client is a SW functionality embedded in the User System.

FA: Foreign Agent. The primary responsibility of an FA is to act as a tunnel agent which establishes a tunnel to a HA on behalf of a mobile node in mobile IP.

HA: Home Agent. The primary responsibility of the HA is to act as a tunnel agent which terminates the mobile IP tunnel, and which encapsulates datagrams to be sent to the Mobile Node in mobile IP.

IETF: Internet Engineering Task Force. The IETF is the standardization organization for the Internet community.

IP: Internet Protocol. IP is a network layer protocol according to the ISO protocol layering. IP is the major end-to-end protocol between Mobile and Fixed End-Systems for Data Communications.

MIP: Mobile IP. MIP is an IP mobility standard being defined by the IETF with the purpose to make IP networks mobility aware, i.e. providing IP entities knowledge on where a Mobile Node is attached to the network. The standard includes the definition of a Foreign Agent and a Home Agent.

MN: Mobile Node. The MN comprises both the Terminal Equipment (TE) and the Mobile Termination (MT).

RADIUS: Remote Authentication Dial-In User Service. RADIUS is the currently, widely deployed AAA protocol. It is a protocol for carrying authentication, authorization, configuration and accounting information between a network access server and a centralized ISP RADIUS server.

Mobile IP is defining a home agent as the anchor point with which the mobile node always has a relationship, and a foreign agent, which acts as the local tunnel-endpoint at the access network where the mobile node is visiting. While moving from one IP subnetwork to another, the mobile node point of attachment (FA) may change. At each point of attachment, mobile IP either requires the availability of a standalone foreign agent or the usage of a co-located care-of address in the mobile node itself.

In general, the Internet protocol datagrams are routed from a source to a destination by having routers to forward datagrams from incoming network interfaces to outbound network interfaces according to information in routing tables. The routing tables typically maintain the next-hop (outbound interface) information for each destination IP address. The destination IP address normally embeds information that specifies the IP client's point of attachment to the network. Correct delivery of datagrams to a client's point of attachment depends on the network identifier portion contained in the client's IP address, which however has to change at a new point of attachment. In order to alter the routing of the datagrams intended for a mobile node to a new point of attachment it is possible to associate a new IP address with the new point of network attachment. On the other hand, to maintain existing transport protocol layer connections as the mobile node moves, the mobile node's IP address must remain the same.

This mobility addressing dilemma is handled in mobile IP by allowing the mobile node to be associated with two IP addresses: a static, "home" address and a dynamic, "care-of" address that changes at each new point of attachment to the Internet. Only the care-of address changes at each new point of attachment, the home address remains unchanged. The home IP address assigned to the mobile node makes it logically appear as if the mobile node is attached to its home network. The home address is the IP address where the mobile node seems to be reachable for other Internet clients and servers.

When the mobile node is not attached to its home network, a mobile agent that is provided in the home network receives traffic directed to the mobile node's home IP address. The home agent routes (tunnels) that traffic to a foreign agent using the mobile node's current care-of address. The care-of address, which identifies the mobile node's current, topological point of attachment to the Internet, is used by the home agent to route datagrams to the mobile node. If the mobile node is not attached to a foreign network, the home agent simply arranges to have the datagram traffic delivered to the mobile node's current point of attachment in the home network. Whenever the mobile node moves its point of attachment, it registers a new care-of address with its home agent.

The further delivery by the home agent to the foreign agent requires that each datagram intended for the mobile node be modified/extended so that the care-of address appears as the destination IP address. This modification of the datagram is sometimes termed a "redirection." The home agent redirects datagrams from the home network to the care-of address by constructing a new IP header that contains the mobile node's care-of address as the datagram's destination IP address. This new header "encapsulates" the original datagram causing the mobile node's home address to have no effect on the encapsulated datagram's routing until it arrives at the care-of address. This encapsulation is commonly known as "tunneling" in the sense that the data datagram burrows or tunnels using the new "routing" header through the Internet, while the encapsulated IP header is completely ignored. When the datagram arrives at the foreign agent the new "routing" header is removed and, the original datagram is sent to the mobile node for properly processing by whatever higher level protocol (layer 4) that logically receives it from the mobile node's IP (layer 3) processing layer.

Foreign agents regularly broadcast agent advertisements that include information about one or more care-of addresses. When a mobile node receives an agent advertisement, it can obtain the IP address of that foreign agent. The mobile node may also broadcast or multicast an advertisement solicitation that will be answered by any foreign agent that receives it. Thus, the agent advertisement procedure allows for the detection of foreign agents, lets the mobile node determine the network number and status of its link to the Internet, and identifies whether it is at home or on a foreign network. Once a mobile node receives a care-of address, a registration process is utilized to inform the home agent of the care-of address. The registration allows the home agent to update its routing table to include the mobile's home address, current care-of address, and a registration lifetime.

The IETF internet-draft on the subject of route optimization in mobile IP is written by Charlie Perkins. It carries the title "Route Optimization in Mobile IP". The current version is "draft-ietf-mobileip-optim-09.txt" and can be found at IETF's website "www.ietf.org/internet-drafts/".

The route optimization extensions provide a way for corresponding nodes to cache the binding of a mobile node and to then tunnel their own datagrams directly to the care-of address indicated in that binding, bypassing the mobile node's home agent. Extensions are also provided to allow datagrams in flight when a mobile node moves, and datagrams sent based on an out-of-date cached binding, to be forwarded directly to the mobile node's new care-of address.

More specifically, the home agent sends a binding update to the correspondent node, including the current care-of address for the mobile node, when intercepting the first datagram from the correspondent node to the mobile node home network address. The correspondent node is equipped with specific software that understands the mobile IP binding update message. It reads out the care-of address from the binding update and installs it in its binding cache. From this point on, the correspondent node sends subsequent datagrams directly to the mobile node using it's the mobile node's care-of address as the destination address of an IP-IP tunnel. No acknowledgment is required for the binding update message, since additional future datagrams from the correspondent node and intercepted by the home agent will cause the sending of another binding update.

Similarly, when any node (e.g., a foreign agent) has a binding cache entry for a mobile node (and thus has no visitor list entry for this mobile node), and receives a tunneled datagram, then the node receiving this tunneled datagram may deduce that the tunneling node has an out-of-date binding cache entry for this mobile node. In this case, the receiving node should send a binding warning message to the mobile node's home agent, advising it to send a binding update message to the node that tunneled this datagram. The mobile node's home agent can be determined from the binding cache entry, because the home agent address is learned from the binding update (that established the cache entry in the first place.) The address of the node that tunneled this datagram can be determined from the datagram's header, since the address of the node tunneling this IP datagram is the outer source address of the encapsulated datagram. As in the case of a binding update sent by the mobile node's home agent, no acknowledgment of this binding warning is needed, since additional future datagrams for the mobile node tunneled by the same node will cause the transmission of another binding warning.

As part of the registration procedure, the mobile node may request that its new foreign agent attempts to notify its previous foreign agent, by including a previous foreign agent notification extension in its registration request message sent to the new foreign agent. The new foreign agent then builds a binding update message and transmits it to the mobile node's previous foreign agent as part of the registration. The new foreign agent requests an acknowledgment of the binding update from the previous foreign agent. This extension includes only those values needed to construct the binding update message that are not already contained in the registration request message. The authenticator for the binding update message is computed by the mobile node using the security association shared with its previous foreign agent. This notification will typically include the mobile node's new care-of address, allowing the previous foreign agent to create a binding cache entry for the mobile node to serve as a forwarding pointer to its new location. Any tunneled datagrams for the mobile node, that arrive at its previous foreign agent after the forwarding pointer has been created, can then be re-tunneled to the mobile node's new care-of address.

The present invention aims at providing a similar result in the form of route optimization, while not requiring the correspondent node to be aware of the mobile IP protocol. In addition to the above mentioned route optimization draft, the following references are also of general interest for the understanding of the present invention:

Alexander, S. et al; DHCP Options and BOOTP Vendor Extensions; http://www.ietf.org/rfc/rfc2132.txt; March 1997.

Calhoun, Pat et al; DIAMETER Base Protocol; http://www.ietf.org/internet-drafts/draft-calhoun-diameter-17.txt and http://www.diameter.orgl; September 2000

Calhoun, Pat et al; DIAMETER Mobile IP Extensions; http://www.ietf.org/internet-drafts/draft-calhoun-diameter-mobileip-11.txt; September 2000.

Calhoun, Pat et al; Mobile IP Network Access Identifier Extension for IPv4; RFC2794; http://www.ietf.org/rfc/rfc2002.txt; March 2000.

Dierks, T et al; The TLS Protocol, First Version; RFC2246; http://www.ietf.org/rfc/rfc2246; January 1999.

Droms, R.; Dynamic Host Configuration Protocol; RFC2131; http://www.ietf.org/rfc/rfc2131.txt; March 1997.

Knight, S et al; Virtual Router Redundancy Protocol; RFC2338; ftp://ftp.isi.edu/in-notes/rfc2338.txt; April 1998.

Montenegro, G.; Reverse Tunneling for Mobile IP; RFC2344; http://www.ietf.orq/rfc/rfc2344.txt; May 1998.

Perkins, Charlie; IP Mobility Support; RFC2002; http://www.ietf.org/rfc/rfc2002.txt; October 1996.

SUMMARY OF INVENTION

The present invention describes a route optimization technique requiring no awareness of the mobile IP protocol by a correspondent node when forwarding traffic using the shortest path between a mobile node and the correspondent node in a visiting domain. The invention describes the management of route entries, network address translations and firewall filters in order to provide a secure, yet flexible deployment of mobile IP route optimization. Specific considerations are described for the case of separate/standalone foreign agent and co-located care-of address respectively.

FIG. 3a illustrates the traffic flow between the mobile node 3 and the correspondent nodes CN 4 when applying above mentioned route optimization. The traffic between the mobile node 3 and the correspondent node CN 4a, i.e. the host situated on the home network 9, will be routed through the mobile IP tunnel 30a over the logical interface 32a by the foreign agent 2. Similarly, the datagrams sent from/to the correspondent node CN 4d on the Internet are tunneled to the home agent 1. The reason for the latter is that the home agent 1 then can advertise an aggregate route for the whole home network 9 towards the Internet instead of advertising mobile node 3 specific routes from individual foreign agents 2.

On the other hand, traffic sent from/to the correspondent nodes 4b and 4c at the local site, hosted by router 5a, are sent the shortest path directly out on one of the local interfaces 32b and 32c of the foreign agent 2 instead of being tunneled to the home agent 1. This is done by setting a static route in the foreign agent 2, which favors a direct route to the visited subnetwork 8 from the mobile node 3 for traffic from the correspondent node 4b and 4c. Similarly, a static route for traffic from the mobile node 3 to the correspondent node 4b and 4c is established in order to send traffic directly out on the interface 32b and 32c.

BRIEF DESCRIPTION OF THE DRAWINGS

The foregoing and other objects, features, and advantages of the invention will be apparent from the following description of preferred example embodiments as well as illustrated in the accompanying drawings in which:

FIG. 2 is a function block diagram illustrating the components within the foreign agent as applied in the present invention, FIG. 4 is a function block diagram illustrating the mobile filter state table in the foreign agent as applied in the present invention, FIG. 5 is a function block diagram illustrating the routing table of the foreign agent when having the mobile node attached, FIG. 9a is a flow chart diagram illustrating the route optimization technique in case of a co-located care-of address, FIG. 10 is a diagram illustrating the mobile firewall state table in the mobile node as applied in the present invention, FIG. 11 is a diagram illustrating the routing table of the mobile node when attached to a visited subnetwork.

FIG. 15a is flow chart diagram illustrating the distribution of X.509 certificates and establishment of security associations in mobile IP, FIG. 15c is a diagram illustrating the format of an X509 certificate, and FIG. 15d is a flow chart diagram illustrating the usage of transport layer proxy in foreign and home agent respectively.

While individual functional blocks and components are shown in many of the figures, those skilled in the art will appreciate these functions may be performed by software modules or programs executed using a suitably programmed digital microprocessor or general purpose computer by individual hardware circuits, by an application specific integrated circuit (ASIC), and/or by one or more digital signaling processors (DSPs).

DETAILED DESCRIPTION OF PREFERRED EMBODIMENTS

In the following description, for purposes of explanation and not limitation, specific details are set forth, such as particular embodiments, circuits, signal formats, techniques, etc. in order to provide a thorough understanding of the present invention. Although specific protocols are referred to for purposes of facilitating the description, the present invention is not necessarily limited to such specific protocols. However, it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

The present invention provides a route optimization technique requiring no awareness of the mobile IP protocol by a Correspondent Node when forwarding traffic using the shortest path between a Mobile Node and the Correspondent Node in a visiting domain.

Figure 1:
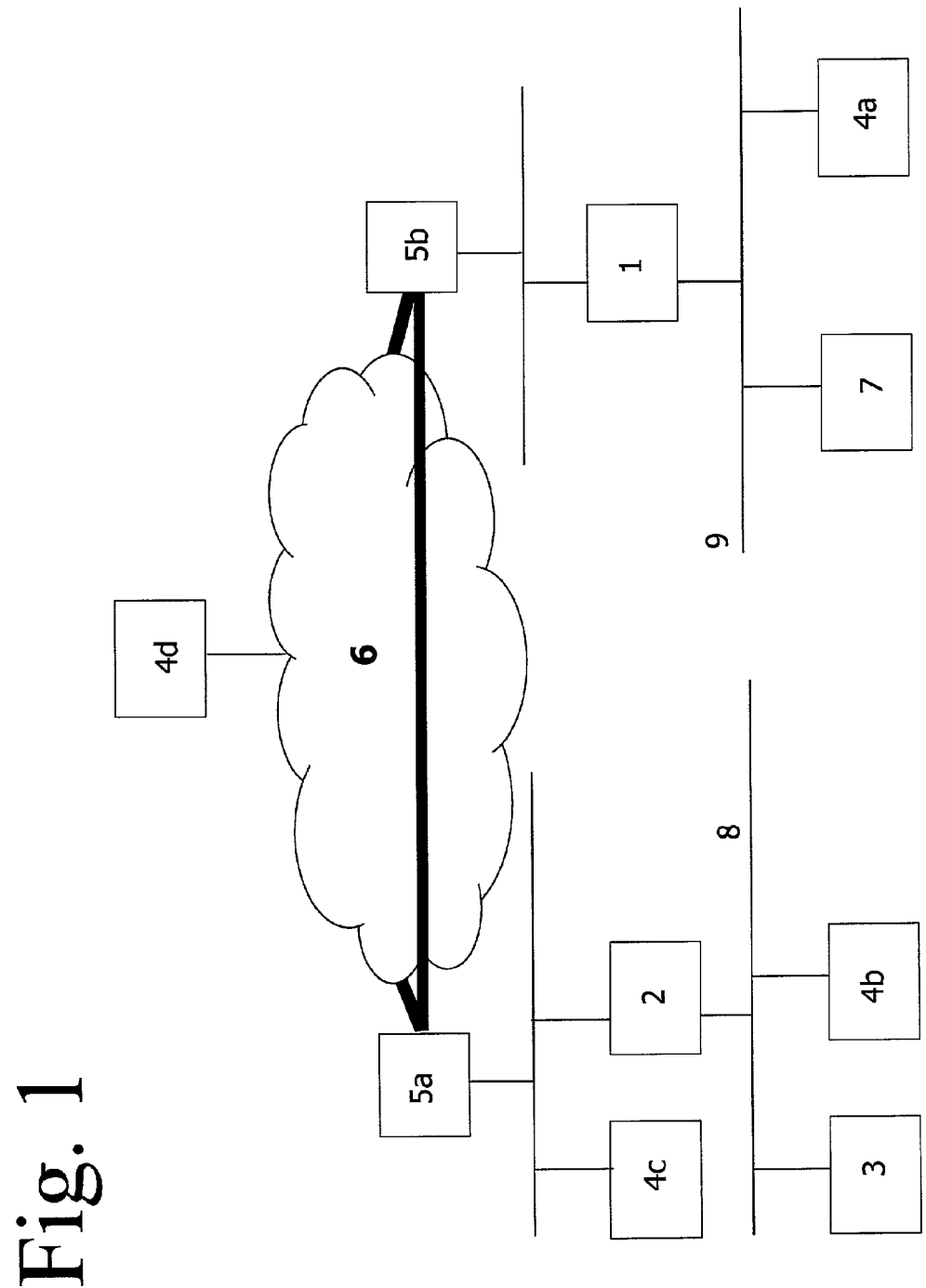
FIG. 1 is a function block diagram illustrating the components in mobile IP when using a separate foreign agent.

FIG. 1 illustrates the components in mobile IP when standalone foreign agents 2 are deployed outside a home network 9, where the home agent 1 (HA) and its mobile service manager 7 (MSM) are installed. The base mobile IP protocol allows any mobile node 3 (MN) to move around, changing its point of attachment to the Internet 6, while continuing to be identified by its IP address in the home network 9. Correspondent nodes 4 (CN) send IP datagrams to a mobile node at its home address in the same way it would with any other destination. This scheme allows transparent interoperation between mobile nodes 3 and their correspondent nodes 4, but forces all datagrams for a mobile node 3 to be routed through its home agent 1. Thus, datagrams to the mobile node 3 are often routed along paths that are significantly longer than optimal. For example, if a mobile node 3 is visiting some visited network 8, even datagrams from a correspondent node 4b on the same subnet must be routed through the Internet 6 to the mobile node's 3 home agent 1 (on its home network 9), only then to be tunneled back to the original visited subnetwork 8 and its foreign agent 2 (acting as router) for final delivery. This "indirect routing" delays the delivery of the datagrams to mobile nodes 3, and places an unnecessary burden on the networks and routers along their paths through the Internet 6.

This invention defines extensions to the operation of the base mobile IP protocol to allow for better routing, so that datagrams can be routed from a correspondent node 4 to a mobile node 3 without going to the home agent 2 first. We refer collectively to these extensions as Route Optimization. In contrast to earlier methods for route optimization, the following invention does not enforce any requirements on mobile IP protocol awareness on the correspondent node 4.

FIG. 2 illustrates the components available in the foreign agent 2. The foreign agent 2 has an LDAP (Lightweight Directory Access Protocol) 25 interface towards the management network 10. One specific entity on the management network 10 is the mobile service manager (MSM) 7, which provides the foreign agent 2 with among other things its own certificate signed by the MSM 7, its private key and the MSM 7 certificate. Note that the private key is not necessarily distributed using the LDAP protocol, but rather may constitute a hardware token or be configured locally at the command line interface of the foreign agent 2. An even more general solution is to require the mobile IP 27 entity to generate its own private and public key and submit the public key to the mobile service manager 7 for certificate creation and signing. This alternative avoids the private key to ever leave the mobile IP 27 entity and, thus enhances the security. The exact details for this management procedure 10 are outside of this patent application.

In addition, the MSM 7 may configure the foreign agent 2 with firewall filters and static routes for mobile nodes 3 located on the visited network 8. However, as is explained in FIG. 6a, this invention also provides a dynamic mechanism for distributing such information from the home agent 1 during the mobile IP 27 and DIAMETER 26 registration procedure. Authenticity and Integrity of those registration extensions are provided by the mobile IP 27 authenticator, which in turn allows the home agent 1 and foreign agent 2 to communicate over the Internet 6.

The AAA client 14 provides the interface and functionality of Authentication, Authorization and Accounting from the foreign agent 2 in the visited network 8 towards the home network 9. The AAA client 14 has an interface towards the mobile IP control engine 16. The mobile IP control engine 16 uses the mobile IP 27 protocol towards both the mobile node 3 on the visited network 8 and the home agent 1 on the home network 9. The mobile IP control engine 16 instructs both the routing engine 20 and the mobile firewall 18 on how to treat datagrams sent to/from the mobile node 3.

The mobile firewall 18 is a new component in a foreign agent 2 compared to the mobile IP standard, IETF RFC 2002. The mobile firewall 18 receives a set of firewall filter definitions from the mobile IP control engine 16 as part of the registration procedure. The received filters are applied to traffic from/towards the mobile node 3 during the time that the mobile node 3 has a valid registration with the home agent 1.

The routing engine 20 also gets instruction from the mobile IP control engine 16. The mobile IP control engine 16 enters static routes with specified costs into the routing engine 20. The static routes were received during the mobile IP 27 registration procedure. The static routes are used to enforce routing policies in the routing table 24, setting preference between local and tunneled payload 152 forwarding. The routing engine 20 may also advertise the mobile node 3 IP address on the visited network 8 using a routing protocol such as OSPF (Open Shortest Path First) 28 or BGP (Border Gateway Protocol) 29.

Figure 3A:
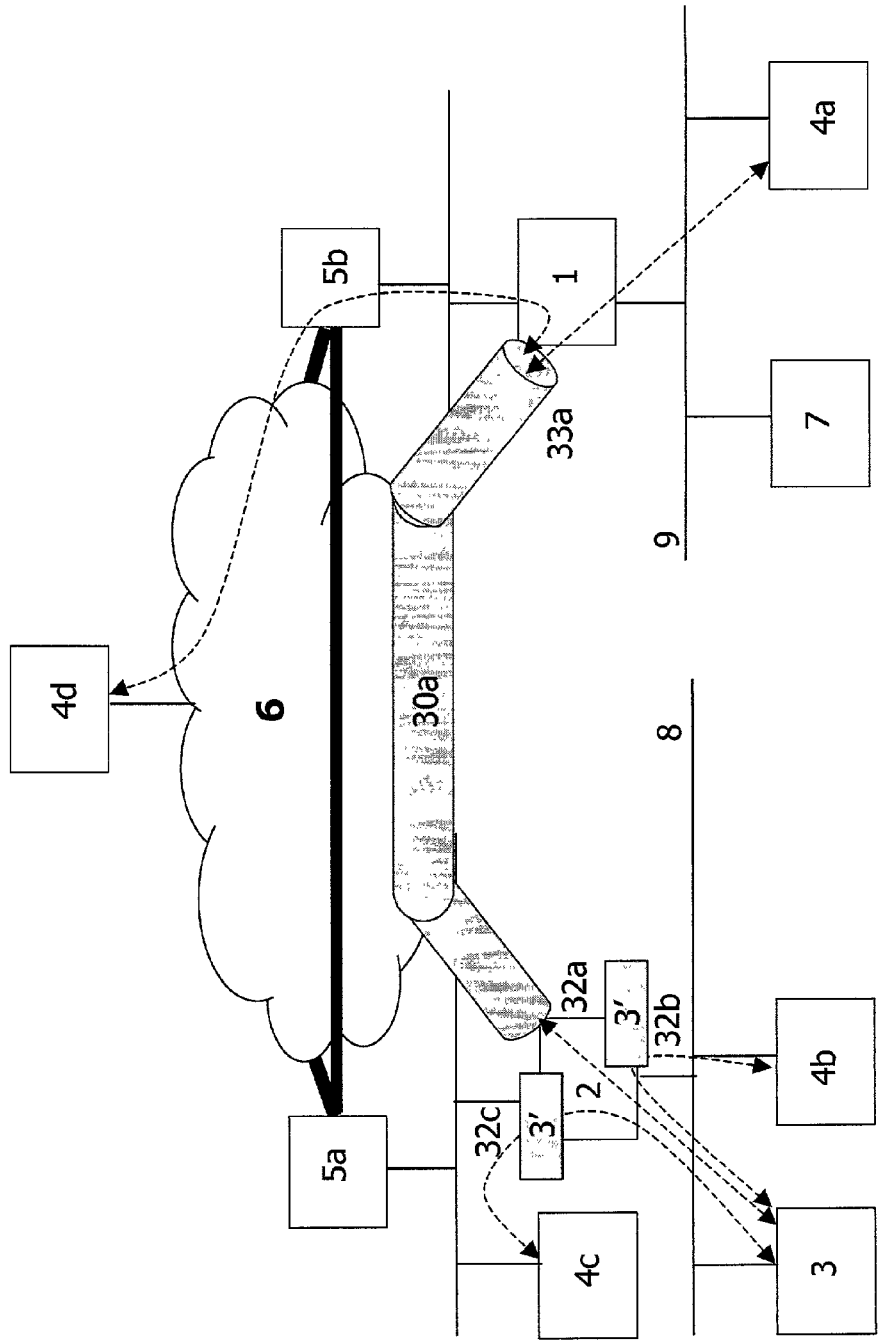
FIG. 3a is a flow chart diagram illustrating the route optimization technique in case of a separate foreign agent.

FIG. 3a illustrates the traffic flow between the mobile node 3 and the correspondent nodes CN 4 when applying route optimization. The traffic between the mobile node 3 and the correspondent node CN 4a, i.e. the host situated on the home network 9, will be routed through the mobile IP tunnel 30a over the logical interface 32a. The routing is performed by the foreign agent 2. Similarly, the datagrams sent from/to the correspondent node CN 4d on the Internet are tunneled to the home agent 1. The reason for the latter is that the home agent 1 then can advertise an aggregate route for the whole home network 9 towards the Internet instead of advertising mobile node 3 specific routes from individual foreign agents 2.

On the other hand, traffic sent from/to the correspondent nodes 4b and 4c at the local site, hosted by router 5a, are sent the shortest path directly out on one of the local interfaces 32b and 32c of the foreign agent 2 instead of being tunneled to the home agent 1. This is done by setting a static route 3' in the foreign agent's 2 routing table 24. This static route 3' favors a direct route to the visited subnetwork 8 for the mobile node 3 IP address, for traffic from the correspondent node 4b and 4c. Similarly, a static route for traffic from the mobile node 3 to the correspondent node 4b and 4c is established in order to send traffic directly out on the interface 32b and 32c.

Figure 3B:
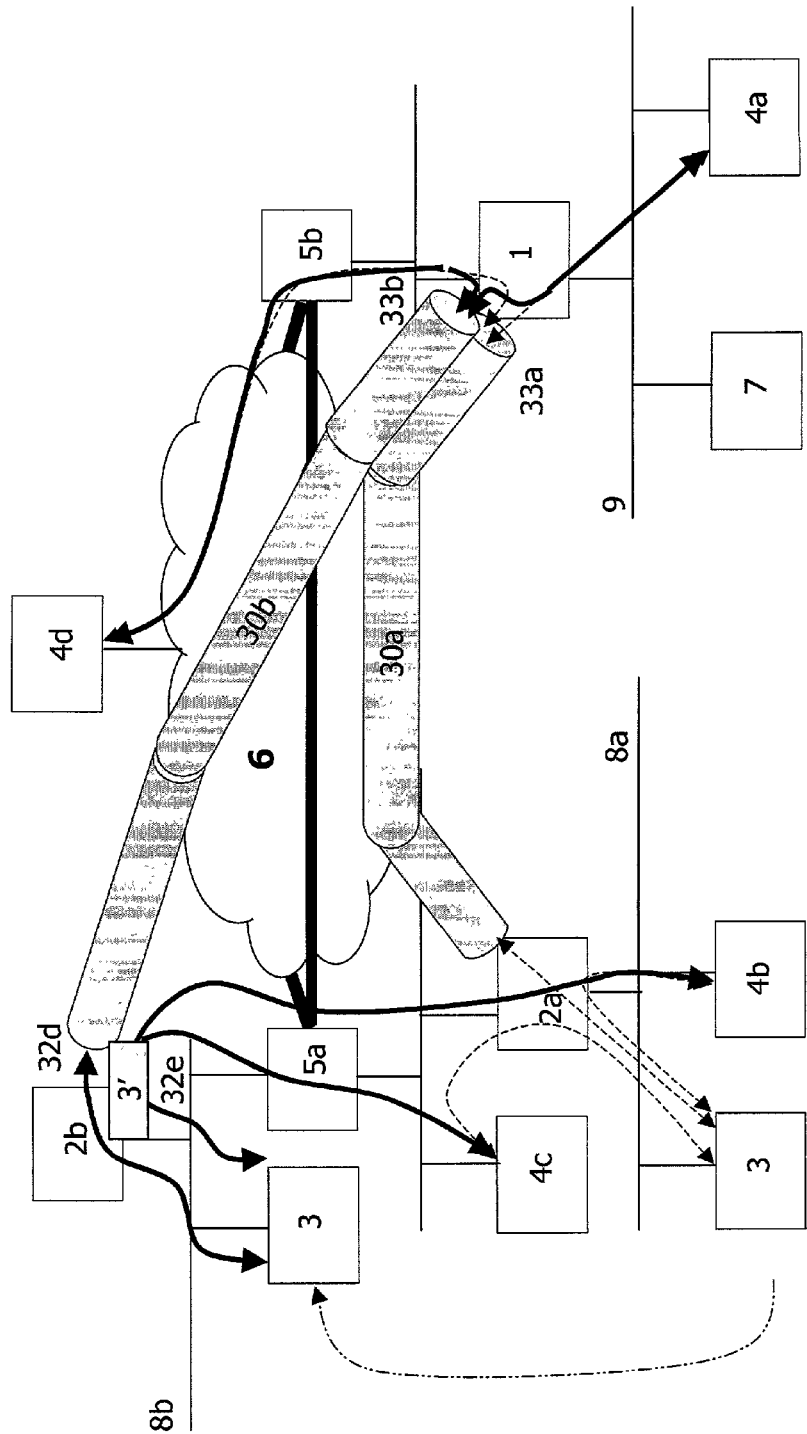
FIG. 3b is a flow chart diagram illustrating handover between foreign agents.

FIG. 3b illustrates what happens when the mobile node 3 moves from one visited network 8a to another 8b. It is assumed that the foreign agents 2a and 2b are instructed to advertise the mobile node 3 route 3' on the local site using a routing protocol, e.g. the open shortest path first protocol with explicit route advertisements. When the mobile node 3 deregisters at the visited network 8a, the foreign agent 2a removes its mobile node 3 route 3'. However, when the mobile node registers at the visited network 8b, the foreign agent 2b will start to advertise the mobile node 3 route 3' with a lower cost than the home agent 1 on the interface 32e. The correspondent nodes 4b and 4c will be able to communicate with the mobile node 3 directly through router 5a to the interface 32e, while the correspondent node 4a and 4d will use the mobile IP tunnel 30b to send and receive traffic from the mobile node 3 via the tunnel interfaces 32d and 33b.

Figure 3C:
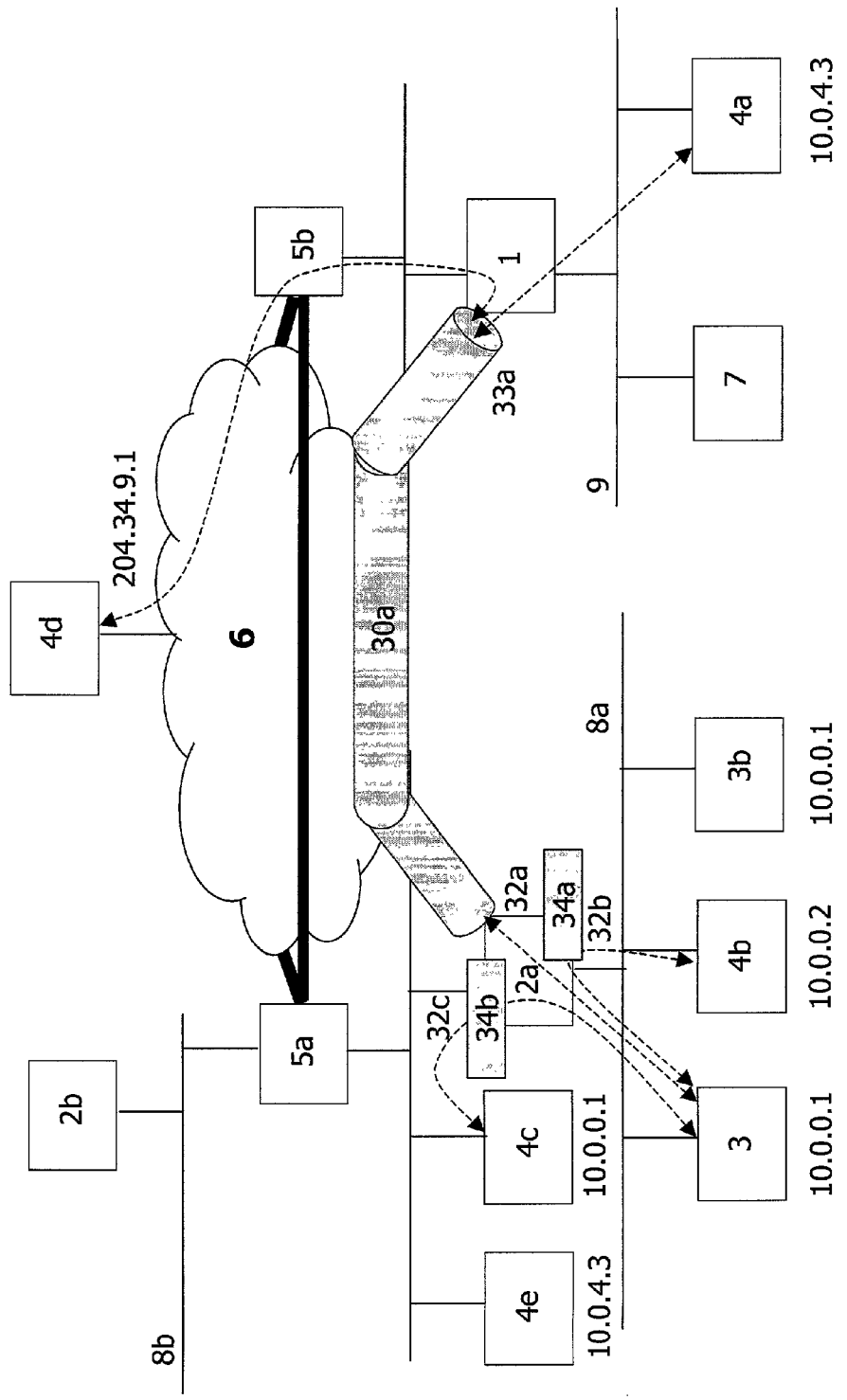
FIG. 3c is a flow chart diagram illustrating the route optimization in foreign agent in case of overlapping address realms.

FIG. 3c illustrates what happens in case of overlapping address realms. Several scenarios have to be considered. For example, the home network 9 address realms for visiting mobile nodes 3 and 3b may be overlapping. For this purpose, the mobile firewall 18 of the foreign agent 2a includes a network address translation (NAT) 34a function indexed by mobile node 3 IP address and link layer address 53. The latter is unique and can be retrieved from the mobile IP control engine 16. The NAT 34a is dynamic in the sense that it is only instantiated in case an unknown datagram (no earlier state) is received at the filter state table 22 from the local visited subnetwork 8. The mobile firewall 18 then checks whether a mobile node 3 has registered with the link layer address 53 of the datagram. If no such user is known by the mobile IP control engine 16, a NAT state is not inserted in the filter state table 22 (it is assumed that the traffic is coming from a correspondent node (CN) 4 belonging to the local visited subnetwork 8). On the other hand, if the mobile node 3 has a valid mobile IP 27 registration, the mobile firewall 18 sets a NAT state 34*a* in the filter state table as a double indexed hash (mobile node 3 home network address+link layer address 53). Subsequent datagrams from the mobile node 3 are easily looked up in the hash-table. The NAT 34*a* is stateful 54, meaning that return traffic towards the mobile node 3 from a correspondent node at the local site CN 4*b* are separated using the link layer address 53 of the mobile node 3 that have initiated the session through the NAT 34*a*. This NAT 34*a* solution will survive a re-registration when a mobile node 3 moves to another foreign agent 2*b*.

Another case of overlapping IP address realms occurs when the mobile node 3 is entering a visited subnetwork 8 in which the foreign agent 2*a* has received address information via the address resolution protocol (ARP) or a routing protocol that indicates overlap with the home network 9 routes or even the mobile node 3 IP address. In the first case, the foreign agent will merely route the traffic through the MIP tunnel 30*a* and ignore the local correspondent node with the overlapping address CN 4*e*. In the latter case, a NAT 34*b* in the mobile firewall 18 of the foreign agent 2 has the task of giving a temporary IP address to the mobile node 3 for traffic towards correspondent node CN 4*c*. This NAT 34*b* solution will not survive a movement of a mobile node 3 to another foreign agent 2*b*. The reason is that the mobile node 3 is using a temporary IP address, hosted by the first foreign agent 2*a*, in its communication with the correspondent node CN 4*c*.

FIG. 4 shows the filter state table 22 of the foreign agent 2*a* in the case of overlapping address realms as described in FIG. 3*c*. The filter state table 22 has five columns:

Source IP address 40;
Destination IP address 41;
Protocol Type 50;
Network address translation (NAT) index 51; and
Action 52.

For the traffic coming through the mobile IP tunnel 30*a*, the filter state table 22 is not applying any NAT index 51. The traffic is filtered based on protocol type 50. Any 50*a* type of protocol is accepted 58 to be sent between the mobile node 3 and the correspondent node 4*a*. Session Invitation Protocol (SIP) and Real-time Transport Protocol (RTP) 50*d* are explicitly denied 56 to be sent between the mobile node 3 and the correspondent node 4*d*. For the HTTP 50*b* traffic from the mobile node 3 to the correspondent node 4*b*, the foreign agent 2*a* applies a dynamic NAT index 51 based on the mobile node IP address 3 and MAC address 53 in order to separate traffic destined for mobile node 3 and 3*b*. The NAT is stateful 54, meaning that HTTP 50*b* traffic sent from the correspondent node 4*b* to the mobile node 3 is reverse NAT based on the session-id allocated at the outgoing HTTP 50*b* traffic case. Similarly, traffic from the mobile node 3 to the correspondent node 4*c* will be allocated a NAT index 51. In this case the foreign agent 2*a* will allocate a temporary new IP address to the mobile node 3 in order to not collide with the address of correspondent node 4*c*. Any 50*a* traffic is accepted 58. It is also mandated by the action column 52 that the data is to be logged 59.

FIG. 5 shows the corresponding routing table 24 of the foreign agent 2*a*. The routing table 24 has four columns:

Source IP address 40;
Destination IP address 41;
Nexthop 42; and
Routing Cost 43.

The routing of traffic from the mobile node 3 to the different correspondent node 4 is based on static routes received during the registration procedure from the home agent 1 (see FIG. 6 for more details). The routes are source-restricted as they only apply to the mobile node 3. As can be seen from the nexthop column 42, the tunnel interface 32*a* is favored for traffic towards correspondent node 4*a* and 4*d*, while the foreign agent 2*a* local interfaces 32*b* and 32*c* are used for datagrams towards the correspondent nodes 4*b* and 4*c* respectively. More specifically, route decisions are based on routing costs 43 in case multiple route entries exist for the same destination. The routing cost is set by routing policies 44-47 (RP). The routing table 24 includes multiple routes for the IP addresses of correspondent node 4*a* and 4*d* respectively. The routing policy 44*a* has lower cost than 44*b* for the purpose of favoring the correspondent node 4*a* in favor of 4*e* at address collisions between the home network 9 and visited network 8*b*. Furthermore, the routing policy 45*a* has lower cost than 45*b* in order to ensure a proper reverse path towards the correspondent node 4*d*. A more complicated situation occurs in case a correspondent node 4*c* has the same address as the mobile node 3. In the case of overlapping IP address realms, the mobile node 3 must be instructed to send traffic towards the foreign agent 2*a* even if the destination IP address is the same as the mobile node source IP address 3. This was the case with correspondent node 4*c*. Similarly, the foreign agent 2*a* is required to allocate a higher cost (48*b*) for the route having nexthop equal to the mobile node 3, i.e. interface 32*b*, than the cost (48*a*) given to routes having the same destination IP address but learned from nexthops other than the mobile node 3, in this case interface 32*c*. Strictly speaking, the foreign agent 2*a* will favor other destinations than the mobile node 3 in case it gets a datagram with source address equal to the destination address from the mobile node 3. A network address translation will be applied to the mobile node 3 source address, as described in FIG. 5, before being sent out on the visited network 8*a*.

When it comes to routes for reaching the mobile node 3, the interface 32*b* is favored regardless if datagrams comes via the mobile IP tunnel 30*a* or directly on a local interface 32*b* or 32*c*. However, ignoring the problems involved due to overlapping address realms and network address translation, there may be alternative routes published, which makes it important that the routing cost 43 is set correctly. An alternate route for reaching the mobile node 3 in the case of correspondent nodes 4*b* and 4*c* would be to reach the mobile IP tunnel 30*a* and interface 33*a* by going through the Internet 6 back to the home network 9 where the home agent 1 is also advertising a route for the mobile node 3. The routing policy 46*a* and 47*a* related to the direct route must always be given lower cost than the route policies 46*b* and 47*b* associated with the home agent 1 route. Note that by applying no visibility of the mobile node 3 from the foreign agent 2*a* towards the Internet 6 ensures that the home network 9 is published as an aggregate route towards the Internet 6, i.e. no individual routes are published directly from the visited network 8*a* towards the Internet 6.

Figure 6A:
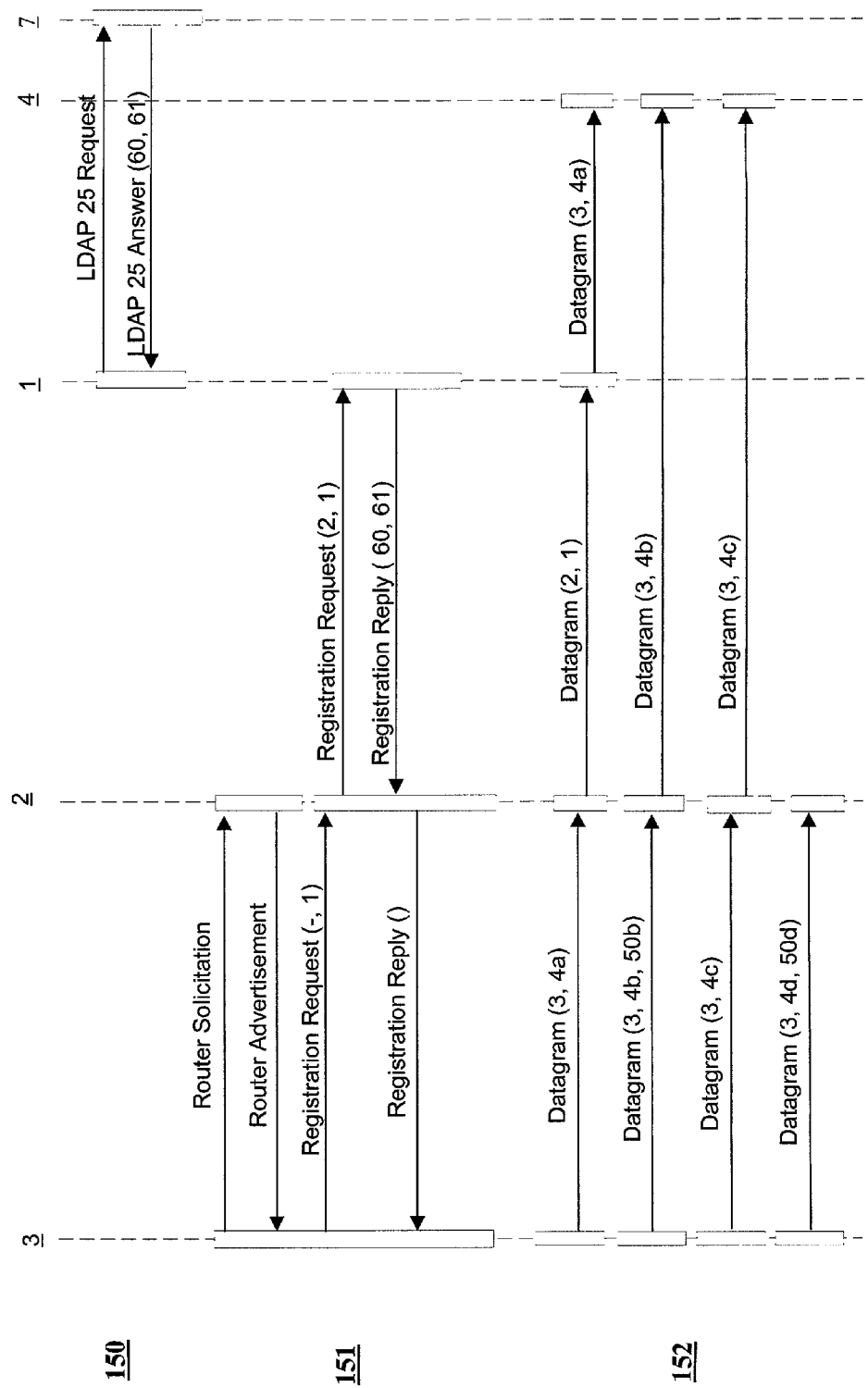
FIG. 6a is a flow chart diagram illustrating the static route and filter distribution as part of the mobile IP registration procedure when using a separate foreign agent.

FIG. 6*a* shows the mobile IP registration procedure when a standalone foreign agent 2 is available at the visited subnetwork 8. Of specific interest to this invention is the distribution of mobile node filters 60 and static routes 61 to be used in the foreign agent 2 filter state table 22 and routing table 24 respectively. In the management plane 150, the home agent 1 is retrieving mobile node filters 60 and static routes 61 using the lightweight directory access protocol (LDAP) 25. In the control plane 151, the home agent 1 will add extensions to the mobile IP registration reply for filters 60 and static routes 61 respectively. The foreign agent 2 will strip the mobile IP registration reply from these extensions before passing it on to the mobile node 3. It will then use the filters 60 and static routes 61 as described in FIG. 4 and 5 in order to route and filter the payload 152 i.e. IP packets to/from the mobile node 3.

Figure 6B:
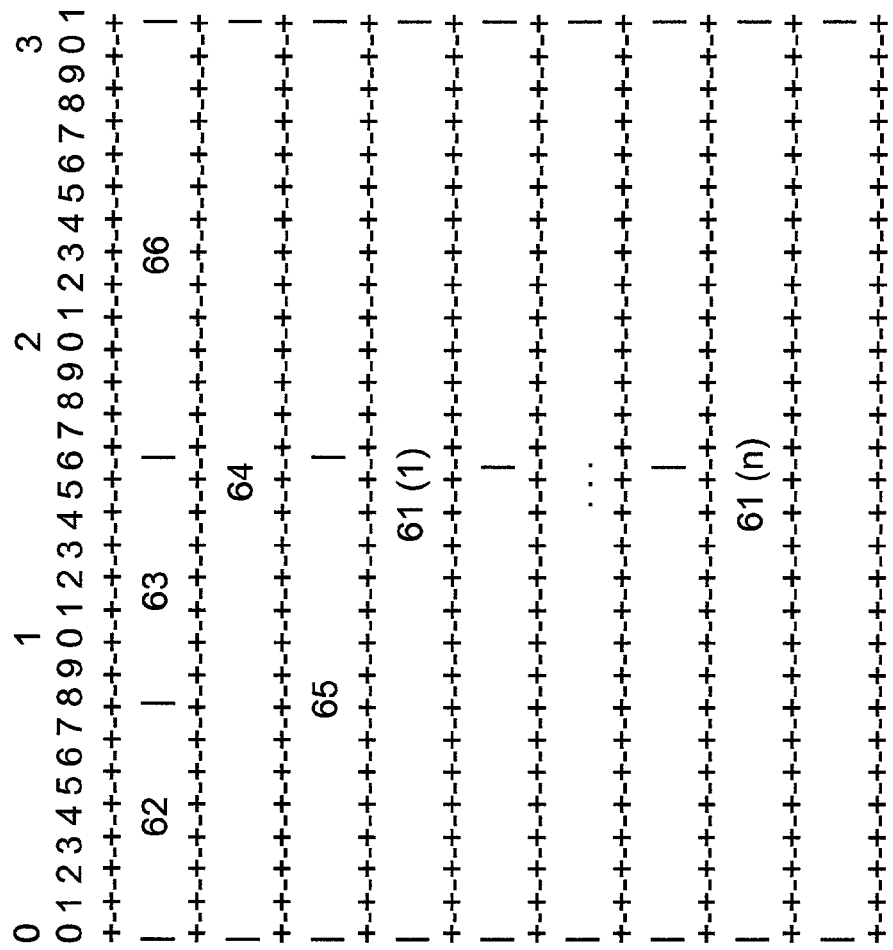
FIG. 6b is a diagram illustrating the mobile IP extension format for static route.

FIG. 6b describes the format of the mobile IP 27 vendor-extension pertaining to static routes 61. Each field has the following meaning:

Type 62: NVSE-Type-Number (to be assigned by IANA);

Length 63: Length in bytes of this extension, not including the Type and Length field;

Reserved 66: Reserved for future use. To be set to 0;

Vendor/Org-ID 64: The high order octet is set to 0, the low order 3 octets are the SMI Network Management Private Enterprise Code of the Vendor in network byte order as defined in the Assigned Numbers RFC;

Vendor-NVSE-Type 65: Indicates the particular type for the VendorNVSE-Extension. In this case it indicates Static Routes; and Vendor-NVSE-Value 61: In this case Static Route, two IP addresses (Static Route) where the first one is the destination address and the second is the router for that address. The number of static routes may be computed from the Length field value.

The static route Vendor-NVSE-Value 61 will either indicate the home agent or the foreign agent as the router for an address. The address may express an address range rather than a single address by using a subnet mask.

Figure 6C:
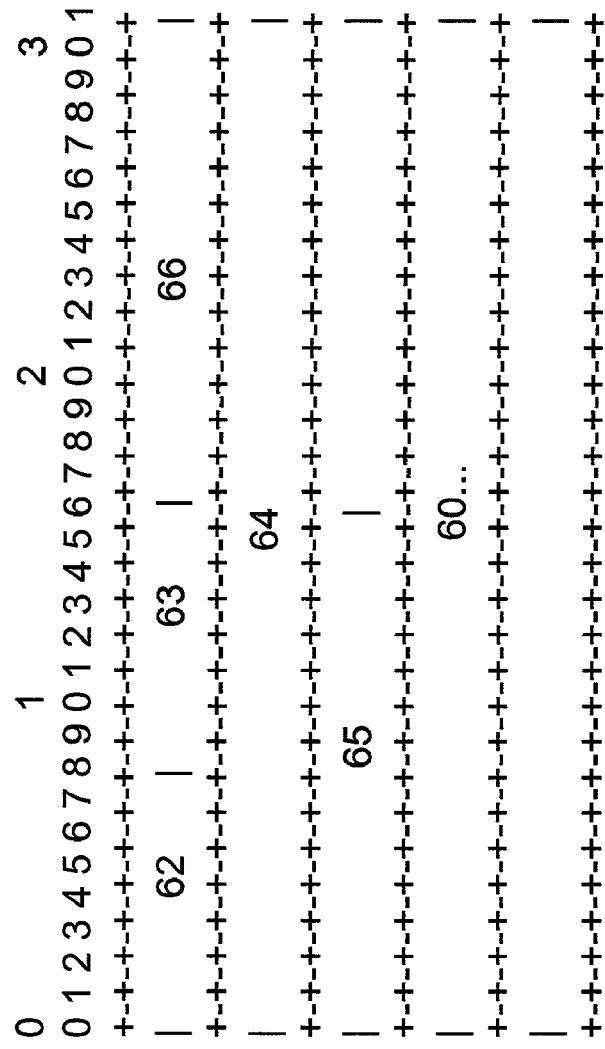
FIG. 6c is a diagram illustrating the mobile IP extension format for firewall filters.

FIG. 6c shows the corresponding extension in mobile IP 27 for the purpose of distributing firewall filters 60 from the home agent 1 to the foreign agent 2 as part of the registration reply message. The fields have the same meaning as described in FIG. 6b except for the last two items:

Vendor-NVSE-Type 65: Indicates the particular type for the Vendor-NVSE-Extension. In this case it indicates Filter Rules; and Vendor-NVSE-Value 60: In this case Filter Rules. Each filter rule contains a source IP address, a destination IP address, a protocol descriptor and an action. The number of Filter Rules may be computed from the Length field value.

Figure 7:
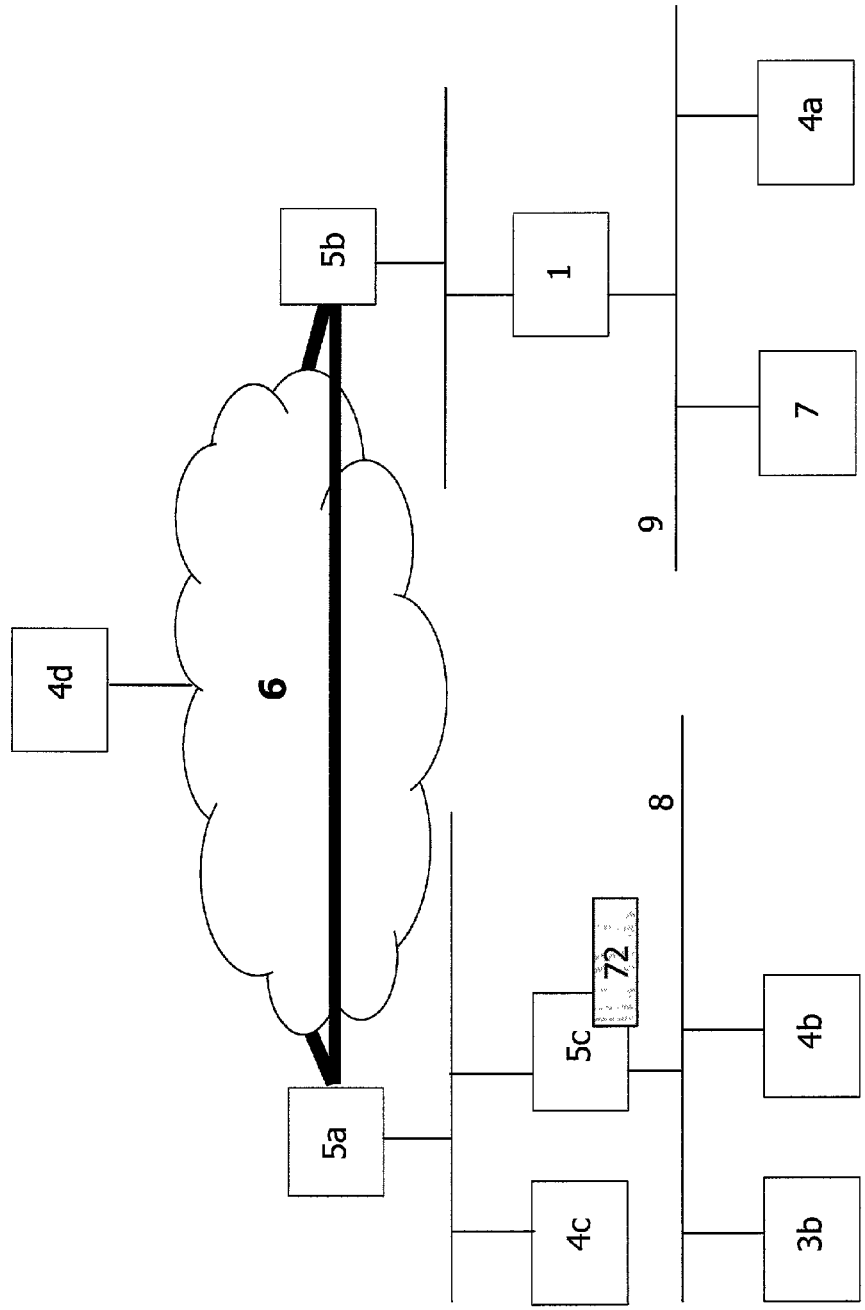
FIG. 7 is a function block diagram illustrating the components in mobile IP when using a co-located care-of address.

FIG. 7 shows the basic configuration for mobile IP 27 in case no foreign agent 2 is available at the visited network 8. The case is denoted co-located Care-of Address 100 and is of specific interest as a remote access solution to the home network 9 from anywhere on the Internet 6.

When the mobile node 3 is entering the visited subnetwork 8, and cannot find a foreign agent 3, it will request a care-of address 100 using the dynamic host configuration protocol (DHCP) 72 towards the local router 5c. When having received a care-of address 100, the mobile node 3 will start its mobile IP 27 registration procedure with the home agent. According to the mobile IP standard RFC 2002, the mobile node 3 will then use a mobile IP tunnel 30a for all traffic going from and to it. As was discussed in FIG. 1, in the case of a standalone/separate foreign agent 3, the compulsory tunneling of datagrams to the home agent 1 causes them to take a longer path than if a direct route to local resources was available. In FIG. 7 traffic between the mobile node 3 and the correspondent nodes 4b and 4c would benefit from such direct routing.

Figure 8:
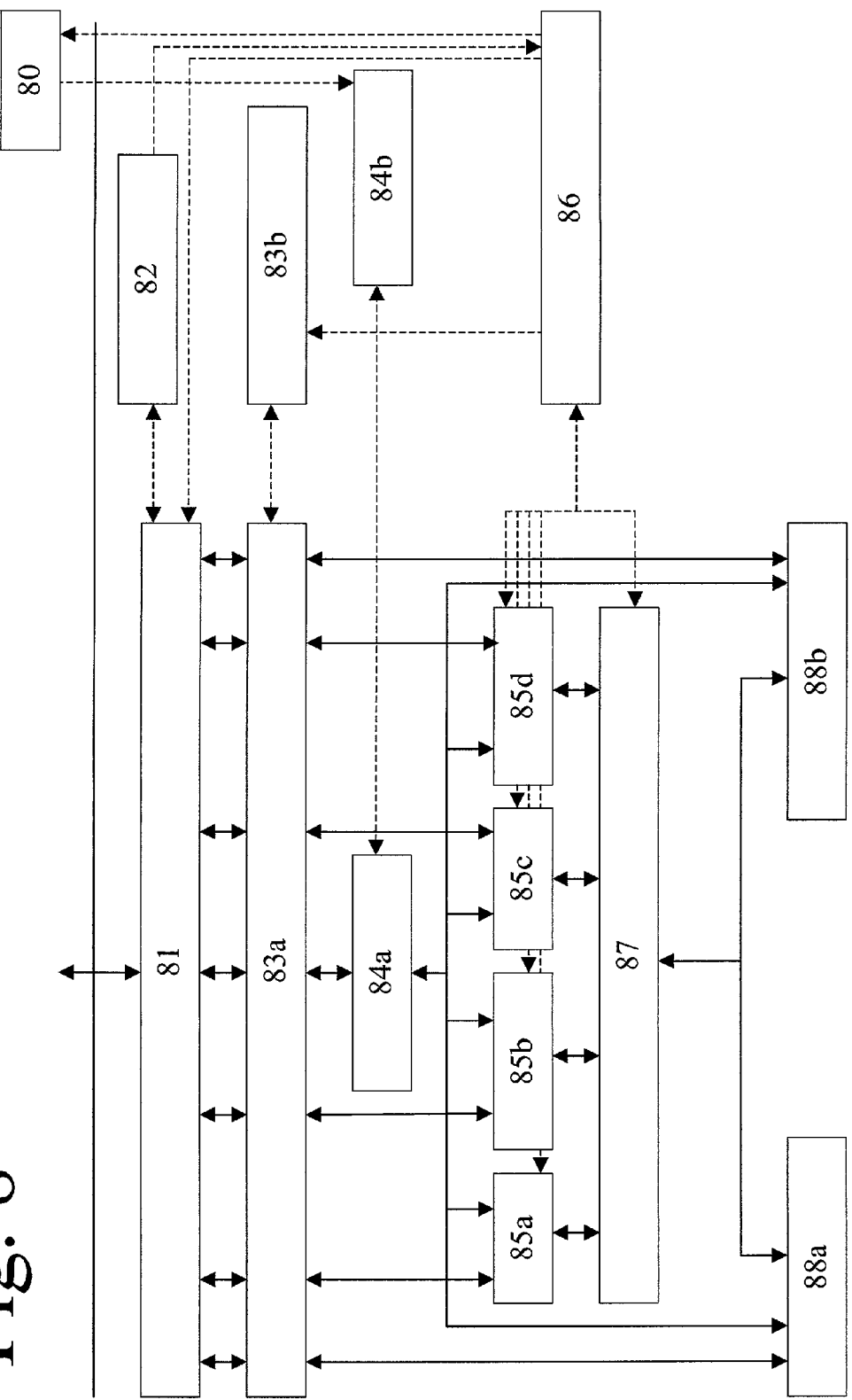
FIG. 8 is a function block diagram illustrating the components in the mobile node as applied in the present invention.

FIG. 8 illustrates the components of a mobile node 3 in which optimized routing is possible both for the case of standalone/separate foreign agent 2 and co-located care of address 100. This is exemplified by four virtual interface adapters 85 running on top of two physical network interface cards for local area network 88a and wireless local area network 88b.

A virtual interface adapter 85a using a co-located care-of address 100 for direct traffic on the visited network 8;

A virtual interface adapter 85b using a standalone foreign agent 2 for reverse tunneled traffic from/to the home network 9;

A virtual interface adapter 85c using a standalone foreign agent 2 for direct traffic on the visited network 8; and A virtual interface adapter 85d using a co-located care-of address 100 for reverse tunneled traffic from/to the home network 9.

Note that the combinations 85a/85d and 85b/85c are mutually exclusive, i.e. they will not be active at the same time.

In between the physical and virtual interfaces is a network interface card selection module 87 that takes decision about which physical interface to run over at each point in time by maximizing availability and bandwidth for the mobile IP 27 payload 152. In addition, the mobile IP 27 control engine 86 is situated at this level in the mobile node's 3 protocol stack. The mobile IP 27 control engine 86 interacts with most other modules in the stack. In the initialization phase of a physical interface 88, it retrieves the IP address that will be used as the care-of address 100 from the DHCP client 82. It sends a mobile IP 27 registration message to the selected network interface card 88 and configures them together with the virtual interface adapters with care-of IP address 100, foreign agent 2 IP address, home agent 1 IP address, tunnel type (IP-IP, GRE or minimal IP), etc. It dispatches information to the mobile firewall 83b, Internet key exchange 80 and TCP/IP routing table 81 about filters, IPSec routes and peers and route costs respectively. The Internet key exchange 80 instructs the IPSec filter 84a via the security association database 84d to utilize security associations with, among others, the home agent 1 for traffic sent on the reverse tunneled virtual interface adapters 85b and 85d. Similarly, security associations may be established with the foreign agent 2 for traffic over the virtual interface adapter 85c and maybe directly towards the correspondent node 4 in case of virtual interface adapter 85a.

Several aspects are worth noting in this mobile node 3 architecture. Foremost the architecture allows traffic to be sent via the virtual interface adapters as well as directly to/from the physical network interface cards 88. The decision to encrypt or not is taken per interface and route. Furthermore, the source IP address of each virtual interface adapter 85 is kept stable for the higher layer components, i.e. TCP/IP routing table 81 and firewall filter state table 83a and IPSec filter 84a. This is especially important for the IPSec filter 84a, which requires a stable source IP address. The source IP address for each virtual interface will be:

85a: local IP address retrieved by DHCP client 82;

85b: stable home address of mobile node 3;

85c: stable home address of mobile node 3; and

85d: stable home address of mobile node 3.

As a consequence, the application programming interface 89 of the mobile node 3 protocol stack can provide the widest selection of routes possible to a destination based on all physical and virtual interfaces available at each single point in time.

FIG. 9a illustrates the case when optimized routing is applied in a mobile IP 27 co-located care-of address scenario. The entities involved are the same as in the previous scenario shown in FIG. 7. However, the mobile node 3 has two interfaces:

One interface 90a with the source IP address set as the mobile node 3 IP address 3' for sending and receiving traffic to the home agent 1 via a mobile IP tunnel 30a; and One interface 90b with the source IP address set to the care-of address 100 received from the DHCP server 72 and to be used for sending and receiving traffic on the visited network 8.

Datagrams sent between the mobile node 3 and the correspondent nodes 4a and 4d will be sent via the interface 90a, while datagrams sent between the mobile node 3 and the correspondent nodes 4b and 4c will be sent through the local interface 90b. Note that mobility is not achieved for TCP sessions in the latter case as the temporary care-of address is used as the source IP address and the mobile node 3 will be allocated a new care-of address by each foreign agent 2. This may not be a large problem as most of the local applications available at the visited network 8, may only be relevant as long as the mobile node 3 is on the visited network 8, i.e. they will anyway be terminated before leaving the visited network 8. A more advanced solution is to decide which interface 90a or 90b to use for a route based on the port number. In this way applications that are sensitive to source IP address changes, and likely to be used while changing from one foreign agent 2 to another, would be forced to be sent on the interface 90a back to the home agent 1 and in such way survive when a mobile node 3 changes its point of attachment. A typical example of such an application is the session invitation protocol (SIP) and real-time transport protocol (RTP) 50d, which will typically be used for voice over IP calls and e.g. streaming video.

Figure 9B:
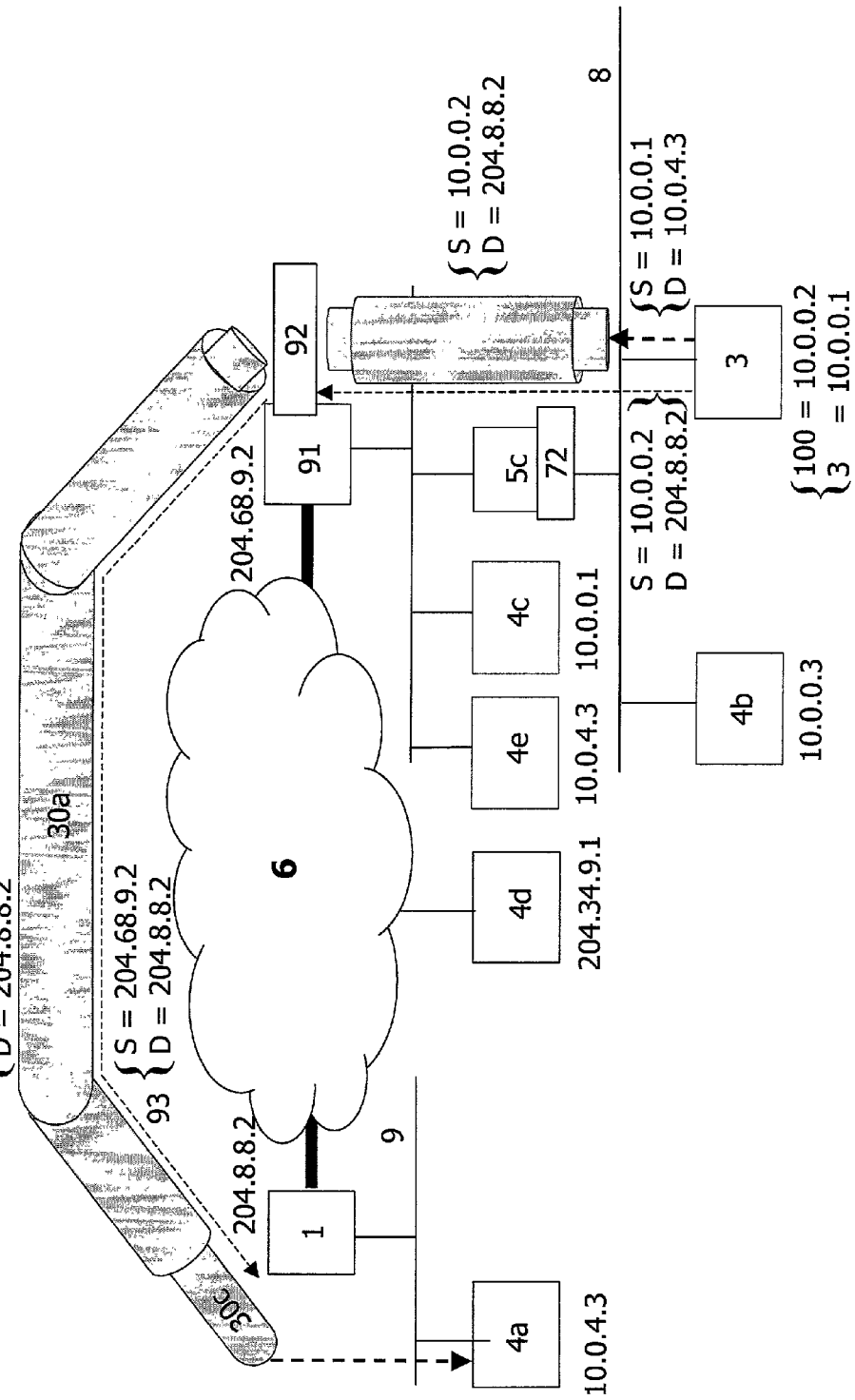
FIG. 9b is a flow chart diagram illustrating the traversal of a firewall with network address port translation in the case of a co-located care-of address.

FIG. 9b shows the more complicated scenario where the mobile node 3 is hidden behind a network address port translation (NAPT) 92 in the visited network 8. The home agent 1 is still considered having a public (unique) IP address towards the Internet 6. This scenario is expected to be very common in light of the broadband access deployment to the residential homes, where many broadband access providers only allocate a private IP address to each house/apartment (seen as the visited network 8 in FIG. 9b) and the mobile users connect to the home agent 1 at the office or the Internet service provider (seen as the home network 9 in FIG. 9b).

As described in FIG. 9a, the mobile node 3 will request a temporary care-of address 100 from the local router 5c and its DHCP server 72 in the visited network 8. In FIG. 9b, the care-of address is set to 10.0.0.2—an address that is allocated from within the address realm in the visited network 8. In addition, the mobile node 3 has a stable address set to 10.0.0.1—an address that is allocated from within the address realm of the home network 8. The details of the registration request 93 procedure will be explained in FIG. 12b, however, for now it is enough to know that the registration 93 will survive the traversal of the firewall 91 and its NAPT 92 by changing the source IP address to the address of the firewall 91, i.e. 204.68.9.2, and being allocated a new UDP source port. The home agent 1 will discover that a NAPT 92 traversal has occurred by comparing the source IP address 204.68.9.2 and the care-of address 10.0.0.2. The mobile IP tunnel 30a is then modified to contain a UDP header 30c as well, in order to facilitate traversal of the NAPT 92 with payload 152 datagrams between the mobile node 3 and the correspondent node 4a (10.0.4.3). Note also, that the source IP header of the registration request 93 as received by the home agent, i.e. 204.68.9.2, will be used as source IP address for the outer IP header in the mobile IP tunnel 30a seen from the home agent instead of the care-of address 100, i.e. 10.0.0.2, that is normally applied.

FIG. 10 is an example of a set of filters that could be applied in the firewall filter state table 83a in the mobile node 3. Note that the filter state table 83a does not apply any network address translation (NAT) index 51 in contrast to FIG. 4. The reason for this is that the source IP address is tied to the virtual interface 85 and as such is made visible up in the firewall filter state table 83a. For the co-located care-of address scenario, the interface 85a provides direct access to the local visited network 8 by using the care-of address 100 (10.0.0.2) as its source address. On the other hand, the interface 85d is providing a tunnel back to the home network 9 using the mobile node address 3 (10.0.0.1) as its source address visible for the applications. Left are four columns in the filter state table 83a, namely the source address 40, the destination address 41, the protocol 50 and the action 52. The filters entries have the same meaning as in FIG. 4 and are not repeated here.

The TCP/IP routing table 81 in FIG. 11 is less obvious and requires more explanation. The mobile node 3 routing table 81 has the same columns as the foreign agent 2 routing table 24 in FIG. 5, i.e. source address 40, destination address 41, nexthop 42 and routing cost 43. In FIG. 5 the routing cost 43 is compared for the interface 90a and 90b respectively. 90a is the interface provided by the virtual interface adapter 85d, i.e. leading to the mobile IP tunnel 30, and 90b is the interface provided by the virtual interface adapter 85a, i.e. sending IP traffic directly on the visited subnetwork 8. Note that in a real implementation, also other interfaces in the mobile node 3 may publish routes that have to be taken into account when deciding which interface to send traffic out on. One particular example of this are the physical network interface cards 88a and 88b, which may also make routes available to the routing table 81. In this example it is assumed that the virtual interface adapter 85a always makes it routing cost lower than the physical interface 88 for all routes that are common for the two.

It is possible to reach the destination 10.0.4.3 both through the mobile IP tunnel 30a (interface 90a) and on the visited subnetwork 8 (interface 90b). It is not known to the routing table 81 that actually two different correspondent nodes 4a and 4e are hidden behind these two destination routes. A generic rule is applied in the mobile node 3 routing table 81 to favor the mobile IP tunnel 30a instead of local access, i.e. the routing policy for reverse tunneling 110a is given lower cost than the routing policy for native connectivity 110b in case of overlapping address realm.

Row 3 defines the route for the destination 10.0.0.3. In this case this route is only available on the local visited subnetwork 8 using the interface 90b. This is largely due to the private address nature of the home network 9 and the visited network 8. In a pure public scenario, there would also be a route published for the correspondent node 4b via the home agent 1. In this case the home agent 1 interface 90a would have a higher cost than the local interface 90b as the mobile node 3 can detect that the correspondent node 4b is on the visited subnetwork 8 using the address resolution protocol.

The next two rows in the routing table 81 relates to the destination address 10.0.0.1. From FIG. 9*b* it is possible to deduce that both the mobile node 3 and the correspondent node 4*c* has this IP address. Similar to what was discussed in FIG. 5, the mobile node 3 is required to place a higher routing cost 112*a* for the localhost interface 90*c* than the routing cost 112*b* it has for an external destination on the visited network 8, as is the case with correspondent node 4*c*.

The last two rows relate to destinations on the Internet 6, and in particular correspondent node 4*d* with IP address 204.34.9.1. It is a corporate policy decision if the local route via interface 90*b* or the tunneled route via interface 90*a* shall be preferred. Both will blend into an aggregate route towards the Internet 9. The local route may have a shorter distance to its destination, but only a session across the tunneled route will survive a move. The final policy may involve a decision based on port number, but in this example the tunneled route is given a lower cost 113*a* than the cost of the local route 113*b*.

Figure 12A:
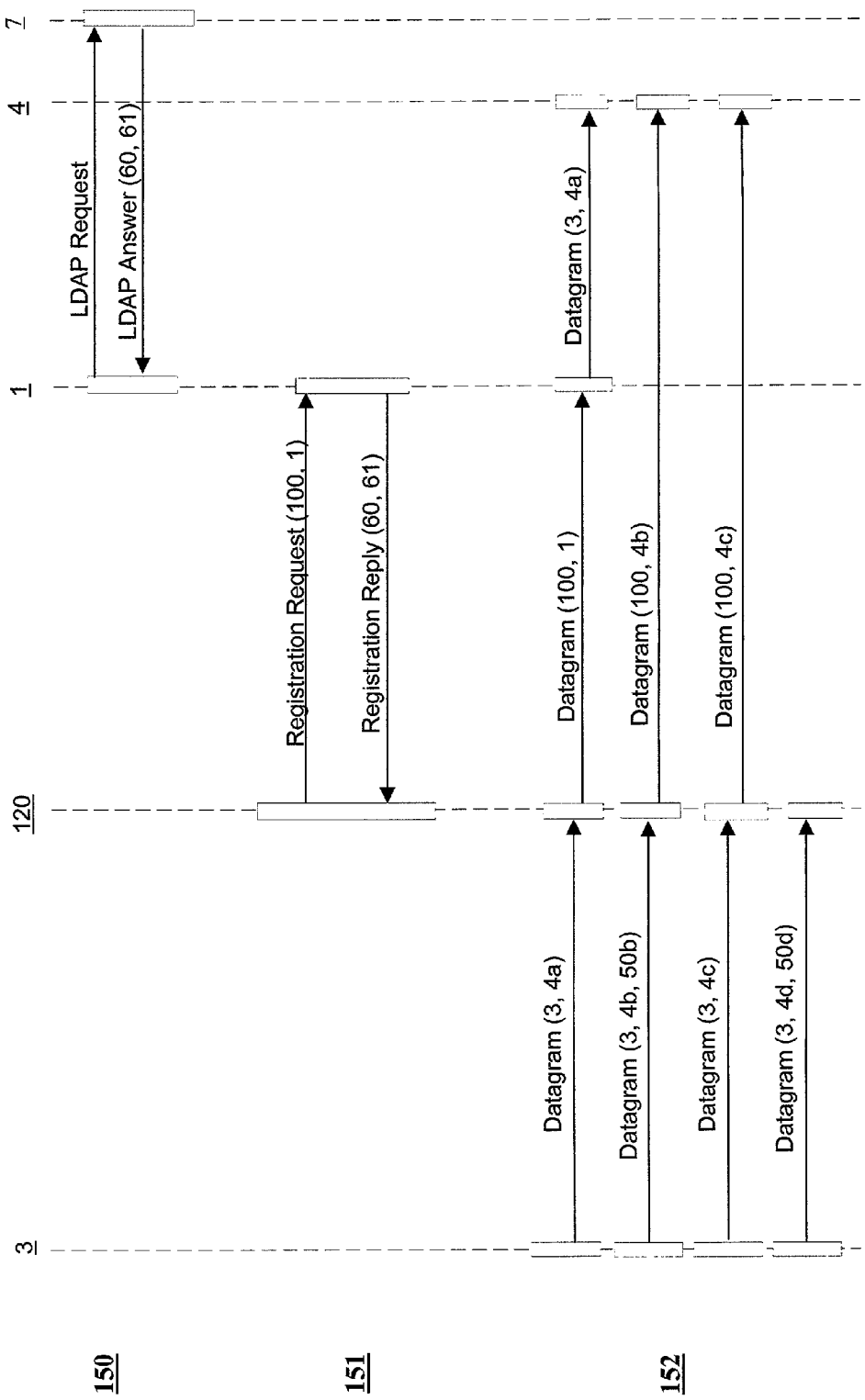
FIG. 12a is a flow chart diagram illustrating the static route and filter distribution at mobile IP registration time when using a co-located care-of address.
Figure 12B:
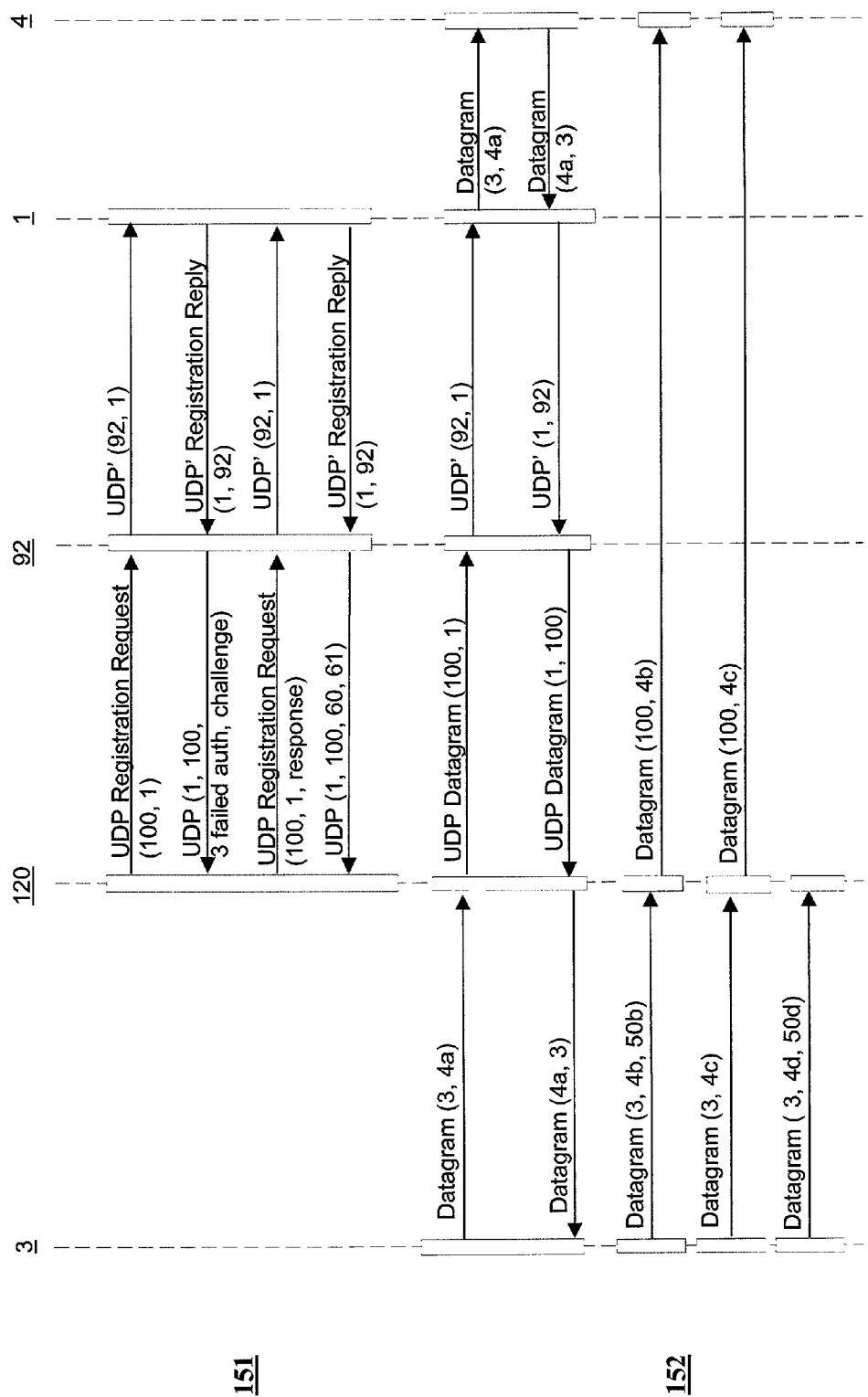
FIG. 12b is a flow chart diagram illustrating the registration procedure in case of traversing a network address port translator.

FIG. 12*a* illustrates the mobile IP 27 registration procedure when a co-located care-of address 100 is allocated to a mobile node 3. FIG. 12*a* assumes that the home network 9 and visited network 8 are part of the same address realm. FIG. 12*b* describes the more complicated case, where a network address translation 92 separates the home and the visited networks into two different realms.

During the management phase 150, the home agent 1 will fetch mobile node 3 data, including mobile node filters 60 and static routes 61, from the mobile service manager 7 using the lightweight directory access protocol 25. At registration request 93 from the mobile node virtual interface adapter 120, the home agent 1 will include the filters 60 and static routes 61 as extensions in the registration reply message as part of the control plane 151 procedures. The mobile node virtual interface adapter 120 can then apply the filters 60 and static routes 61 in very much the same way as the foreign agent 2 did in FIG. 6*a* when payload 152 are sent from the mobile node to the correspondent nodes.

Datagrams towards correspondent node 4*a* are tunneled to the home agent 1 using the care-of address 100 as source IP address before being delivered natively on the home network 9 with the mobile node 3 as source address.

Datagrams to the correspondent nodes 4*b* and 4*c* sent directly out on the visited network 8 based on the static routes 61 and using the care-of-address 100 as the source address.

Datagrams to the correspondent node 4*d* from the mobile node 3 are restricted by the filter 60 in order not to allow the real-time transport protocol 50*d*.

FIG. 12*b* describes the registration procedure when applying NAPT 92 in between the mobile node 3 and the home agent 1. The mobile node 3 sends a mobile IP 27 registration request 93 towards the home agent 1. The registration request 93 includes the care-of address 100 as one field inside the registration message. The registration request 93 is sent with the UDP destination port equal 434 and the UDP source port set to any chosen port number. The source IP address of the registration request 93 is set to the care-of address 100 and the destination IP address is set to the home agent 1 public IP address 204.8.8.2.

When the registration request 93 is traversing the NAPT 92, the source IP address will be modified to the public IP address of the firewall 91, namely 204.68.9.2. In order to distinguish between datagrams sent from different nodes in the visited network 8, e.g. correspondent node 4*b* and mobile node 3, the NAPT 92 will also hold a state table with the care-of address 100 and the UDP source port number on the inside and a newly allocated UDP source port number on the outside of the firewall 91. The latter UDP source port number is selected so that it is unique among the sessions traversing the NAPT 92 at any point in time.

The home agent 1 will discover the discrepancy between source IP address 204.68.9.2 and care-of address 10.0.0.2 inside the registration request 93 message. In order to verify the sender, the home agent 1 will send a registration reply reject code "failed authentication" and submit a challenge for the mobile node 3 to respond to. The mobile node 3 will interpret the behavior of the home agent 1 in such a way that a new registration is required for it to pass a NAPT 92. The mobile node 3 calculates the response to the challenge using its key and sends the new registration message. The home agent 1 verifies the response to the challenge using the shared key or public key of the mobile node 3. If authenticated successfully the home agent 1 adds the mobile node filter 60 and static routes 61 in the registration reply message and the payload sessions 152 may start.

There are two differences in the way payload 152 transfer is performed when a NAPT 92 is present in the path as shown in FIG. 12*b*. First of all the payload 152 datagrams to be sent through the mobile IP tunnel 30*a* are required to have a UDP header in between the two IP headers. This will ensure that the datagram will pass through the NAPT 92 and allow the NAPT 92 to use the UDP source port to create a unique id for the payload 152 session in order to be able to map back to the correct IP address and source UDP port on the inside of the firewall 91 when traffic is coming back from the home agent 1. The second item is that the home agent 1 is applying the source IP header of the registration request 93, i.e. the IP address of the NAPT 92 204.68.9.2, as the destination IP address also for datagrams destined for the mobile node 3. This is in contrast with the current IETF standard RFC 2002, where the home agent 1 is using the care-of address 100 as the destination IP address. The routing and filtering in the mobile node 3 virtual interface adapter 120 is performed in the same way as described for FIG. 12*a* and will not be repeated here.

Figure 13A:
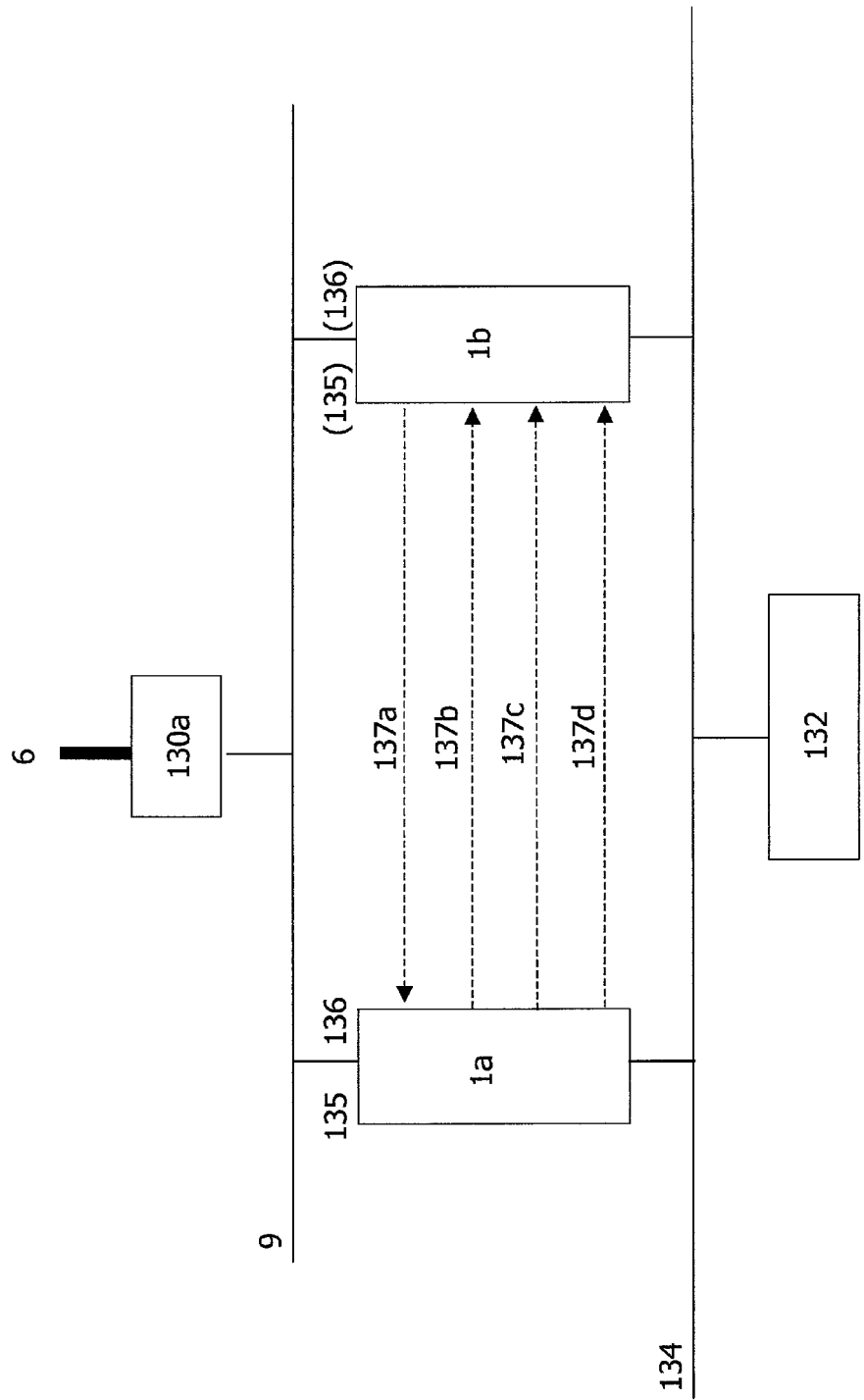
FIG. 13a is a flow chart diagram illustrating the home agent failover support in the home network using the virtual router redundancy protocol.

FIG. 13*a* is concerned with the redundancy and home agent 1 availability in the home network 9. FIG. 13*a* suggests a structure where two or more home agents 1 are linked together to form a virtual home agent hidden behind an Ethernet switch 130*a*, and then connected to the Internet 6 where the mobile nodes 3 are roaming. One physical home agent 1 *a* is designated to be the primary home agent for the virtual home agent IP address 136 and MAC address 135. The other home agent 1*b* is assigned to be secondary (backup) home agent for the same IP and MAC address in case the primary fails. In order to be able to take over the role of the primary home agent 1*a* at any time and with minimal disturbance to the mobile nodes 3, the secondary home agent 1*b* will have to be updated with all registrations that are received by the primary home agent 1*a*. The virtual router redundancy protocol (VRRP) IETF RFC 2338 is extended with three new packet types for this purpose. When the secondary home agent 1*b* boots, it will send a VRRP data dump request 137*a* to the primary home agent 1*a* with subtype=mobileIP. This request is sent using the unique addresses of the home agents 1 and may very well be sent across a backend network 134 as shown in FIG. 13*a*. The primary home agent 1*a* will respond with a VRRP data dump message 137*b*, which contains all the currently valid mobile node 3 registrations. After this boot behavior, the primary home agent 1*a* will forward all mobile IP registration messages received for the IP address 136, using a VRRP data forward message 137d. The VRRP advertisement message 127c is left unchanged compared to RFC 2338 and will still have the function of making the secondary home agent 1b aware if the primary home agent 1a is alive or not. In case of failure to the primary home agent 1a, the secondary home agent 1b will take on the role as home agent for the address pair 136 and 135 (shown in brackets in FIG. 13a). New mobile node 3 registrations will come directly to the secondary home agent 1b. In the same way as the primary home agent 1a has been querying an LDAP or RADIUS server 132 for subscriber data, the secondary home agent 1b will do the same thing for current and new registrations received.

Note that the procedure presented in FIG. 13a does not specify failover support of IKE 80/IPSec between the primary 1a and secondary 1b home agent. IPSec/IKE security associations must either be renegotiated in the case of failover or VRRP extensions, similar to the ones for mobile IP 27, may be defined for all dynamic IKE 80 security associations as well. However, IPSec replay protection information (per packet) might always be lost also in the latter case.

Figure 13B:
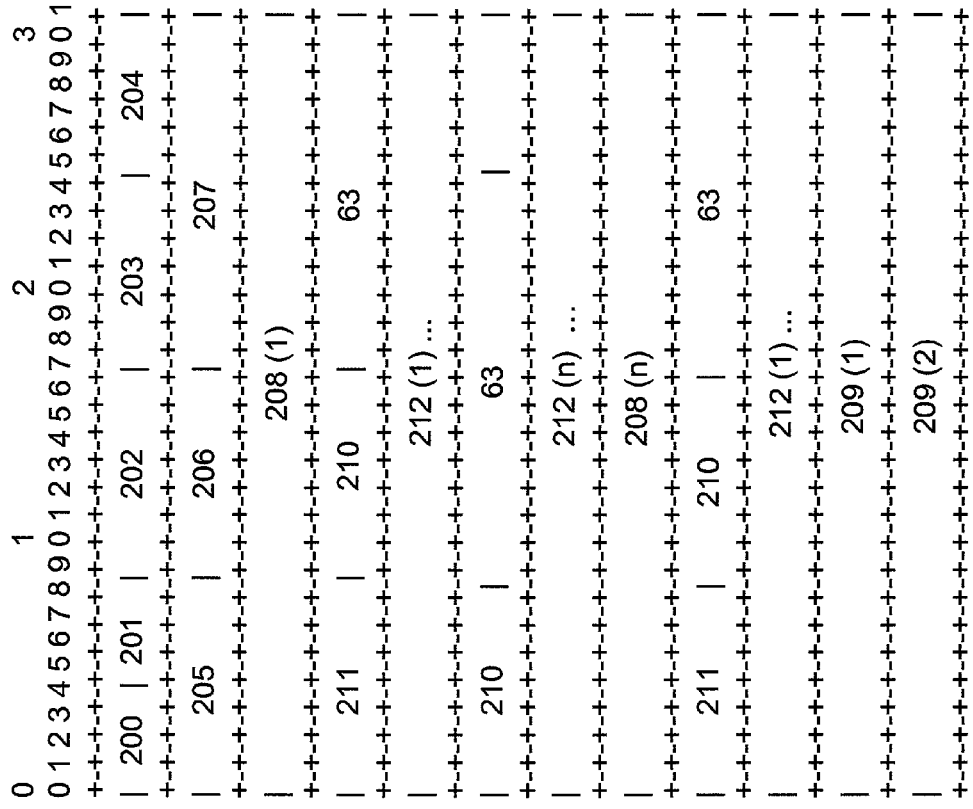
FIG. 13b is a diagram illustrating the format of packet type mobile IP registration dump in the virtual router redundancy protocol.

FIG. 13b shows the format of one of the new VRRP messages (VRRP Data Dump 137b) introduced for the purpose of home agent 1 failover support.

Version 200: Protocol version 2

Type 201: Type of VRRP packet is Data Dump (not equal to 1)

VRID 202: Virtual router identifier

Priority 203: The priority of the sending VRRP router for the virtual router. Higher values equal higher priority.

Count Addr 204: Number of IP addresses contained in this VRRP packet

Auth Type 205: Identifies the authentication method being utilized

0—No authentication

1—Simple Text Password

2—IP Authentication Header

Adver Int 206: The time interval between Registration Advertisements

Checksum 207: Checksum of the VRRP message

IP Address(1 . . . n) 208: One of more IP addresses that are associated with the virtual router (in this case home agent IP addresses)

Authentication Data 209: String for simple text password

Count-D 211: Number of data blocks of this IP Address

Subtype 210: Type of data (in this case indicating mobile IP registration requests)

Length 63: Length of individual data field

Data (1 . . . n) 212: Content for transfer (in this case active Mobile IP Registration Request)

The VRRP solution in FIG. 13a and b provides failover support between two home agents 1a and 1b for the same virtual home agent IP address 136. The most common setup will be that a home agent acts as primary for one virtual home agent IP address 136 and secondary for another. The effect is a redundant setup that will survive failure of anyone of the involved components, in this case home agents 1.

Figure 14A:
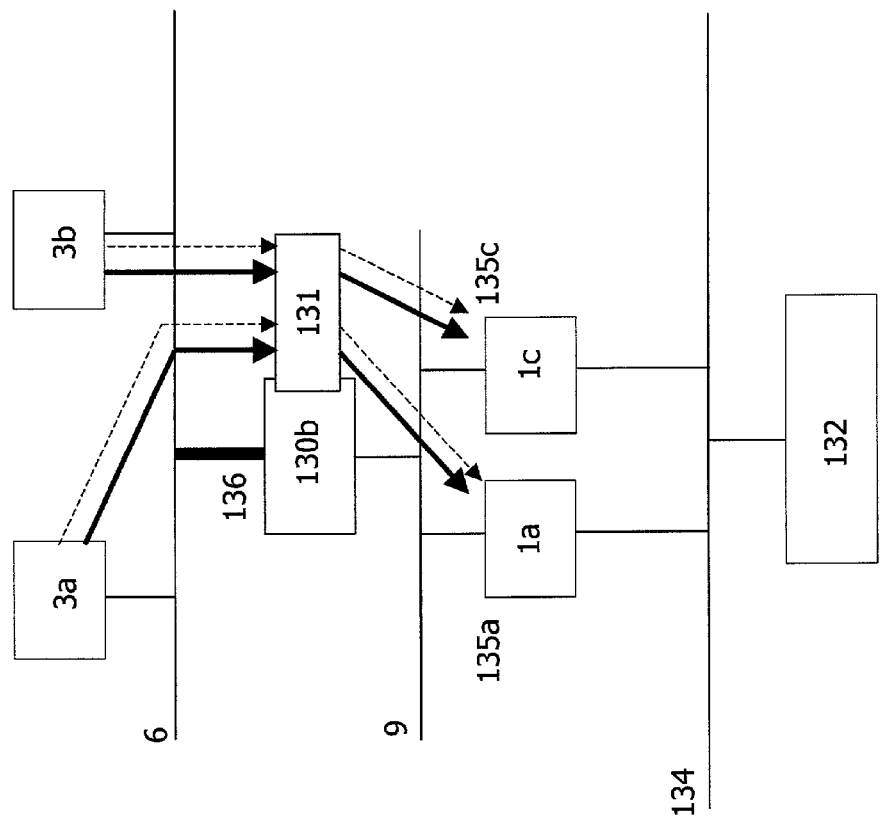
FIG. 14a is a function block diagram illustrating the load distribution in the home network using a Load Balancer.
Figure 14B:
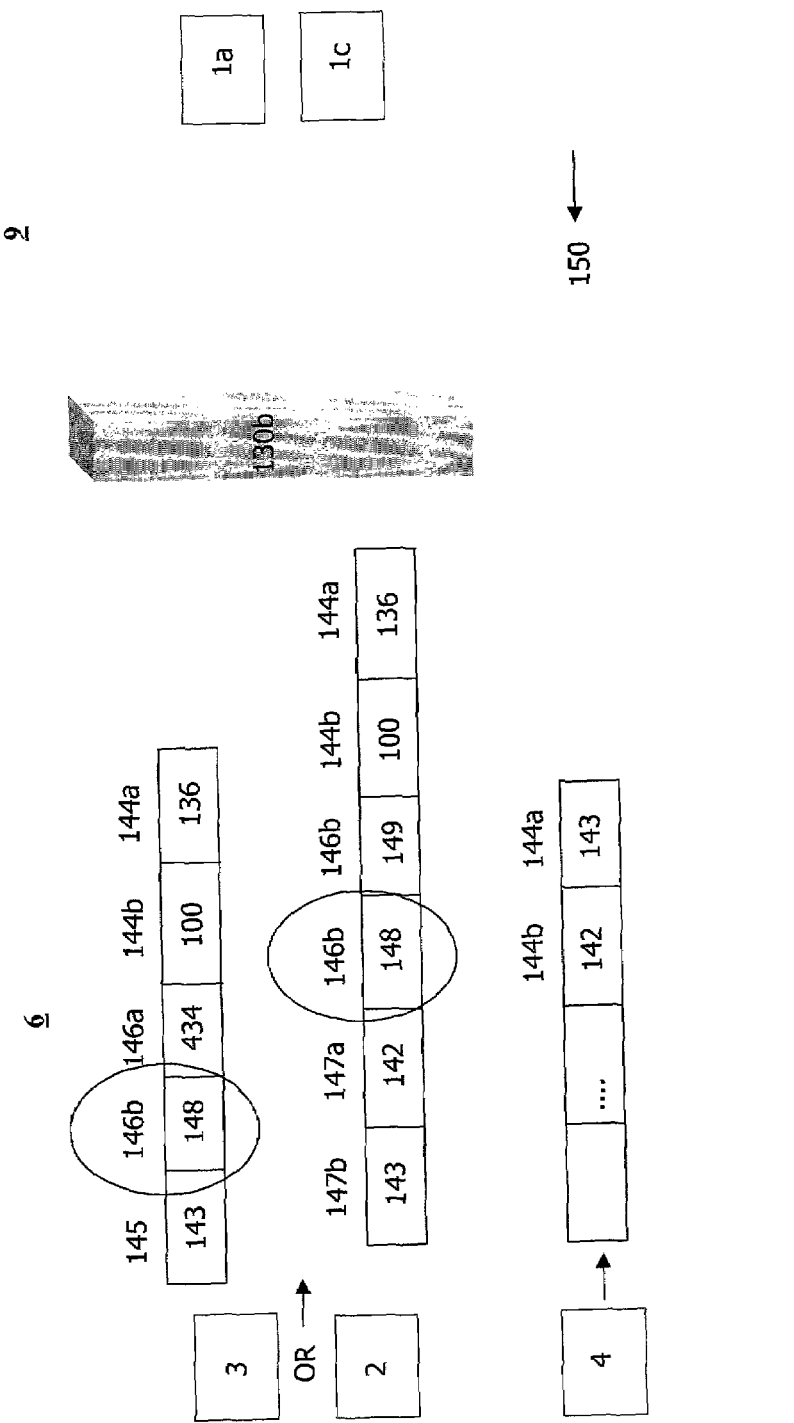
FIG. 14b is a function block diagram illustrating the configuration of the Load Balancer.

FIG. 14a illustrates a loadbalancing scheme among a large cluster of home agents 1. Its purpose is to spread the load of all mobile node 3a and 3b control messages 151 and corresponding payload 152 in order to achieve a scalable architecture. The distribution is achieved by having mobile IP datagrams routed to a load balancer 130b with UDP in between the two IP payload headers in a similar way as described for NAPT 92 traversal in FIG. 9b. The load balancer 130b is most often an Ethernet switch 130a equipped with a dispatcher function 131. In this case the dispatcher is using the UDP source port number to dispatch datagrams between the home agents 1. FIG. 14b will explain in more detail how this is done.

An important aspect of loadbalancing is that the mobile node 3 shall not need to be aware that it is present. For this reason, the load balancer 130b will host the home agent 1 IP address 136 that all mobile nodes 3a and 3b on the Internet 6 can use for their registration request messages 93. Traffic will be directed from the load balancer 130b to the home agents' 1a and 1c hardware (e.g. MAC) address 135a and 135c based on UDP port number. All home agents 1 on the home network 9 have the same IP address 136, and reply to clients with that single IP address 136, thus avoiding the overhead of NAT re-writing on the way back.

However, each home agent 1a and 1c will also be equipped with at least one unique IP address on the home network 9 or a separate backend network 134, in order to advertise reachability of the mobile node 3a and 3b towards correspondent nodes 4. As in FIG. 13a, the mobile node 3 subscription data may be stored in a separate LDAP or RADIUS server 132 in order for the dispatcher 131 to be independent of mobile node 3. The selected home agent 1a or 1c will not retrieve the mobile node 3 subscription data until receiving the registration request 93.

FIG. 14b describes the schema from which the load balancer 130b dispatch datagrams sent form the mobile node 3 to the home agent 1 IP address 136. The datagram header format in FIG. 14b is numbered according as follows:

144a: Outer header destination IP address;

144b: Outer header source IP address;

146a: UDP destination port number;

146b: UDP source port number

147a: Inner header destination IP address;

147b: Inner header source IP address; and

145: Content in mobile IP 27 registration request message 93.

It is proposed to use a simple UDP dispatcher 131 based on UDP source port number 146b as the internal mechanism in the load balancer 130b. In contrast to, e.g., a more complex scheme based on mobile node 3 IP address 143, the UDP dispatcher 131 will not need to understand the mobile IP protocol 27 and open up the registration request message 93.

In order for mobile IP 27 payload from the mobile node 3 or the foreign agent 2 to traverse the load balancer 130 it is required to place a UDP header 146 in between the two IP headers 144 and 147 for all payload 152, i.e. the same technique that was applied to go through a NAPT 92 in FIG. 9b. In addition, the source IP header of the payload 152 and the mobile IP control message 151 (specifically the registration request message 93) has to have the same source port number in order for both to be dispatched to the same home agent 1a or 1c by the load balancer 130b. The mobile node 3 and foreign agent 2 can select a random UDP source port number value 148 and the load balancer 130 will use the combined information of source IP address 144b and source UDP port number 146b to dispatch to packets.

The header for the registration request message 93 will then have the following values:

Destination IP address 144a: home agent IP address 136;

Source IP address 144b: care-of IP address 100;

UDP destination port number 146a: 434 (indicates mobile IP 27 control message);

UDP source port number 146b: Randomly selected value 148; and

Registration request message content 145: among other things the mobile node 3 IP address 143.

Similarly, a payload 152 datagram sent from the mobile node 3 or foreign agent 2 to the home agent 1 will have the following header values:

Outer Destination IP address 144a: home agent IP address 136;
Outer Source IP address 144b: care-of IP address 100;
UDP destination port number 146a: Randomly selected value 149;
UDP source port number 146b: Randomly selected value 148 (but same as for registration request message above);
Inner Destination IP address 147a: correspondent node 4 IP address 142; and
Inner Source IP address 147b: mobile node 3 IP address 143.

The return traffic from the home agent 1 to the mobile node 3 or foreign agent 2 will not be modified by the load balancer 130b. The same applies to advertisements of mobile node availability 150 through the address resolution protocol or a routing protocol like OSPF 28 or BGP 29. In these cases the home agent 1a or 1c will use its unique IP address instead of the shared home agent IP address. Finally, datagrams sent from the correspondent node 4 will also be sent natively with the mobile node 3 IP address 143 as destination and its own address 142 as source, i.e. without going through the UDP dispatcher 131 of the load balancer 130b.

When allowing a foreign agent 2 to perform route optimization on behalf of the home agent 1, it is of importance to have a flexible key distribution mechanism in order to allow authentication between all entities in the mobile IP 27 system. The mobile IP 27 systems today rely on shared authentication keys between the mobile node 3, the home agent 1 and the foreign agent 2 in order to authenticate the control messages 151. This is not a scalable solution when the number of possible foreign agents 2 increases. One solution to this problem is to keep the shared key solution, but to use an AM client 14 in the foreign agent 2 in order to distribute shared session keys from the home network 9 using the DIAMETER 26 protocol as shown in FIG. 2. FIG. 15a proposes an alternative solution based on public keys and X.509 certificates 154. By applying public keys, each mobile IP 27 entity (mobile node 3, foreign agent 2, and home agent 1) is only required to hold three security entries:

The private key for the mobile IP 27 entity;
The public key for itself in the form of an X.509 certificate 154 signed by the mobile service manager 7; and
The X.509 certificate 154 of the mobile service manager.

This should be compared with holding the shared keys of all the mobile IP 27 entities that it should communicate with.

FIG. 15a describes the registration procedure when extended to support X.509 certificate 154 and public keys. Apart from generating the three security entries as described above, the mobile service manager 7 also makes available a list of revoked certificates 153 to all entities in the mobile IP 27 system through LDAP 25 in the management plane 150, as part of an online certificate status protocol RFC 2560, or in the form of DNS Security RFC 2535 SIG records. The mobile service manager 7 acts as the certificate authority for the mobile IP 27 system, and may in turn have its X.509 certificate 154 signed by a higher order certificate authority, like Verisign, in the case that two or more mobile IP 27 systems, with separate administration, are interconnected.

Figure 15B:
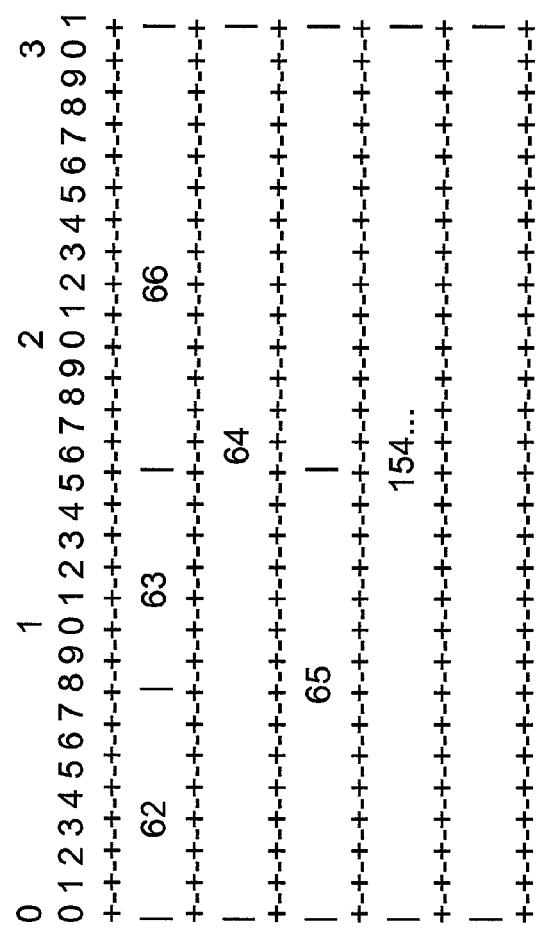
FIG. 15b is a diagram illustrating the mobile IP extension format for X509 certificates.

In the control plane 151, the mobile node will append its own X.509 certificate 154a as an extension to the mobile IP 27 registration request 93. The format of this extension is presented in FIG. 15b. The receiving entity (in this case the foreign agent 2) will check that the signature of the X.509 certificate 154d is from the mobile service manager 7 and verify that the mobile node 3 is not in the revocation list 153. This latter check can either be based on a local revocation list, an online certificate status protocol request or DNS query. FIG. 15a exemplifies the first alternative. If successful, the foreign agent 2 entity will use the received X.509 certificate 154d for decrypting the authenticator in the mobile IP 27 registration request 93 and establish a security parameter index (SPI) with a predetermined value designated to public key usage.

In a similar way, the other mobile IP 27 entities may establish security associations with each other using the certificates of the mobile node 154a, foreign agent 154b and home agent 154c as received in the registration request and reply messages respectively.

In order to limit the requirements on revocation check in the mobile node 3, the home agent 1 may perform the revocation list verification of the foreign agent 2 certificate on behalf of the mobile node 3. If successful, the home agent 1 signs the foreign agent 2 certificate and adds it to the registration reply message. Now the mobile node 3 merely has to hold a valid home agent 1 certificate in order validate any foreign agent certificate. No revocation lists need to be transferred across the, possibly low-bandwidth, access link.

For the payload 152, the Internet key exchange (IKE) 80 protocol may utilize the same certificates 154 to establish IPSec security associations. IKE 80 packet 5 will include the initiating parties certificate 154, while packet 9 will include the responding parties certificate 154.

FIG. 15b illustrates the format of the mobile IP 27 extension as applied to X.509 certificates 154. As the generic fields already have been described along with FIG. 6b, we will concentrate on the structure of the X.509 certificate 154. A X.509 certificate 154 is presented in FIG. 15c. As can be seen the Issuer 159 statement refers back to the mobile service manager 7. The common name CN under the subject 160 heading is normally expressed in the form of a fully qualified domain name (FQDN). However, for mobile IP 27 it is better to use either the mobile node IP Address 157 or a User Fully Qualified Domain Name (UFQDN) 156 as the identity of a peer. These two fields are therefore added to the certificate 154 under the heading X.509v3 Subject Alternative Name 158. If the IP Address 157 is available it will be used. In other case the UFQDN 156 will be applied. Note that the format of the UFQDN is the same as the format for a Network Address Identifier (NAI) in mobile IP 27. This similarity makes the integration seamless and no new identities have to be added to the mobile IP 27 protocol.

Lastly, it should be noted that the architecture described in this invention, having IPSec run on top of the mobile IP tunnel 30, makes it easy to replace IPSec and IKE 80 with the Transport Layer Security Protocol (TLS) if so requested. This is exemplified in FIG. 15d, where the foreign agent 2 and home agent 3 act as TLS application proxies when the mobile node 3 is accessing correspondent nodes 4 on the visited 8 and home 9 network respectively. Such a scenario may have several advantages for an IT-administrator. Foremost it will relieve the mobile node 3 to establish security associations with every correspondent node 4 and vice versa. Furthermore, it off-loads heavy encryption tasks from the correspondent node 4 to an agent 2 or 3, which more likely have encryption implemented in hardware. Finally, by performing encryption on the application layer rather than the IP layer opens up the possibility to apply differentiated services based on transport protocol and port number within the home network 9, visited network 8 and the Internet 6 respectively.

The invention claimed is:

1. A method for mobile internet protocol (IP) route optimization comprising:
   registering a mobile node with a mobile IP visiting network having a mobile IP protocol;
   adding a route entry for the registered mobile node to a routing table in a mobile IP foreign agent of the mobile IP visiting network, wherein the route entry includes:
   a destination address comprising an address for a home network of the registered mobile node;
   a nexthop value comprising a local interface to which the registered mobile node is attached;
   a routing cost comprising a value lower than all other routes available to the registered mobile node; and
   forwarding a datagram from a correspondent node to the registered mobile node using the shortest path between the mobile node and the correspondent node, wherein the correspondent node is unaware of tunneling between the registered mobile node and a home agent of the registered mobile node and wherein the shortest path is defined based on the routing table.

2. The method of claim 1, further comprising:
   routing the datagram based on the destination address.

3. The method of claim 1, wherein routing the datagram comprises using a routing protocol comprising one of Open Shortest Path First (OSPF), and Border Gateway Protocol (BGP).

4. The method of claim 3, further comprising a step of routing the datagram based on the destination address, wherein the step of routing the datagram comprises performing source-restricted destination address routing.

5. The method of claim 4, wherein a route of the datagram is not propagated to a router using a routing protocol.

6. A method for mobile internet protocol (IP) route optimization comprising:
   registering a mobile node with a mobile IP visiting network, wherein the mobile node is in the mobile IP visiting network having a mobile IP protocol, and wherein registering the mobile node with the mobile IP visiting network includes a dynamic host configuration procedure in a home network;
   adding a route entry for the registered mobile node to a routing table in a mobile IP foreign agent of the mobile IP visiting network;
   distributing one or more static routes and filters for the registered mobile node to the mobile IP foreign agent, wherein distributing the one or more static routes and filters occurs at a time of registering the mobile node, wherein the one or more static routes and filters includes the added route entry; and wherein distributing the one or more static routes comprises including the one or more static routes as an extension in a mobile IP registration reply message as part of the dynamic host configuration procedure;
   assigning a home agent tunnel a lower routing cost in the routing table as a nexthop compared to local IP connectivity for the one or more distributed static routes;
   assigning local IP connectivity a lower routing cost in the routing table as a nexthop compared to a home agent tunnel for one or more other static routes distributed as part of the dynamic host configuration procedure; and
   forwarding a datagram from a correspondent node to the registered mobile node using a shortest path between the mobile node and the correspondent node, wherein the shortest path is defined based on the routing table.

* * * * *